United States Patent
Borella et al.

(10) Patent No.: US 7,080,151 B1
(45) Date of Patent: Jul. 18, 2006

(54) METHOD AND SYSTEM FOR MOBILE IP HOME AGENT REDUNDANCY BY USING HOME AGENT CONTROL NODES FOR MANAGING MULTIPLE HOME AGENTS

(75) Inventors: Michael S. Borella, Naperville, IL (US); Abhishek Sharma, Mt. Prospect, IL (US); Chandra Warrier, Schaumburg, IL (US); Ravideep Bhatia, Rolling Meadows, IL (US); Arun Alex, Schaumburg, IL (US); Sudhir Kunnath, Schaumburg, IL (US)

(73) Assignee: UTStarcom, Inc., Alameda, CA (US)

( * ) Notice: Subject to any disclaimer, the term of this patent is extended or adjusted under 35 U.S.C. 154(b) by 276 days.

(21) Appl. No.: 10/113,184

(22) Filed: Apr. 1, 2002

(51) Int. Cl.
*G06F 15/16* (2006.01)

(52) U.S. Cl. .................. 709/230; 709/105; 709/245; 709/248

(58) Field of Classification Search ............... 709/105, 709/230, 245, 248; 455/432.1
See application file for complete search history.

(56) References Cited

U.S. PATENT DOCUMENTS

| | | | | |
|---|---|---|---|---|
| 5,473,599 | A * | 12/1995 | Li et al. | 370/219 |
| 5,862,345 | A * | 1/1999 | Okanoue et al. | 709/238 |
| 6,195,705 | B1 * | 2/2001 | Leung | 709/245 |
| 6,366,561 | B1 * | 4/2002 | Bender | 370/238 |
| 6,487,605 | B1 * | 11/2002 | Leung | 709/245 |
| 6,567,664 | B1 * | 5/2003 | Bergenwall et al. | 455/433 |
| 6,594,490 | B1 * | 7/2003 | Toyoda et al. | 455/433 |
| 6,707,809 | B1 * | 3/2004 | Warrier et al. | 370/351 |
| 6,795,705 | B1 * | 9/2004 | Warrier et al. | 455/435.1 |
| 2003/0095523 | A1 | 5/2003 | Korus et al. | 370/338 |
| 2003/0182433 | A1 * | 9/2003 | Kulkarni et al. | 709/228 |
| 2004/0063402 | A1 * | 4/2004 | Takeda et al. | 455/41.1 |

FOREIGN PATENT DOCUMENTS

WO    PCT/US03/10107    2/2003

OTHER PUBLICATIONS

"Home Agent Redundancy"; www.ipunplugged.com/pdf/HomeAgentRedundancy.pdf.*
Chambless, et al., "Home Agent Redundancy Protocol (HARP)," Oct. 27, 1997.*
S. Knight et al., Virtual Router Redundancy Protocol, RFC 2338, Apr. 1998.*
Li et al., "Cisco Hot Standby Router Protocol (HSRP)", RFC 2281, Mar. 1998.*
"Cisco Home Agent Redundancy and Load Balancing", White Paper.*
Binkley, J. R. et al., "Secure Mobile Networking", NTIS, Aug. 1995–Jun. 1999.*

* cited by examiner

*Primary Examiner*—Saleh Najjar
*Assistant Examiner*—Oanh Duong
(74) *Attorney, Agent, or Firm*—McDonnell Boehnen Hulbert & Berghoff LLP

(57) ABSTRACT

A method and system for Mobile Internet Protocol (IP) device redundancy. As mobile devices roam away from a home network and change a connective status, mobility binding records are sent to a multicast network address on the home network. The multicast network address multicasts the mobility binding records to other active Mobile IP home agent control nodes, standby home agent control nodes and standby home agents on the home network. The method and system allows standby home agent control nodes or standby home agents to be transparently switched for active home agent control nodes or active home agents that fail without downloading or uploading large numbers of mobility binding records after a failure. The method and system may also help reduce failed calls (e.g., data sessions including Voice over IP (VoIP), H.323, etc.), network congestion and improve user satisfaction in Mobile IP systems.

47 Claims, 12 Drawing Sheets

PROTOCOL STACK

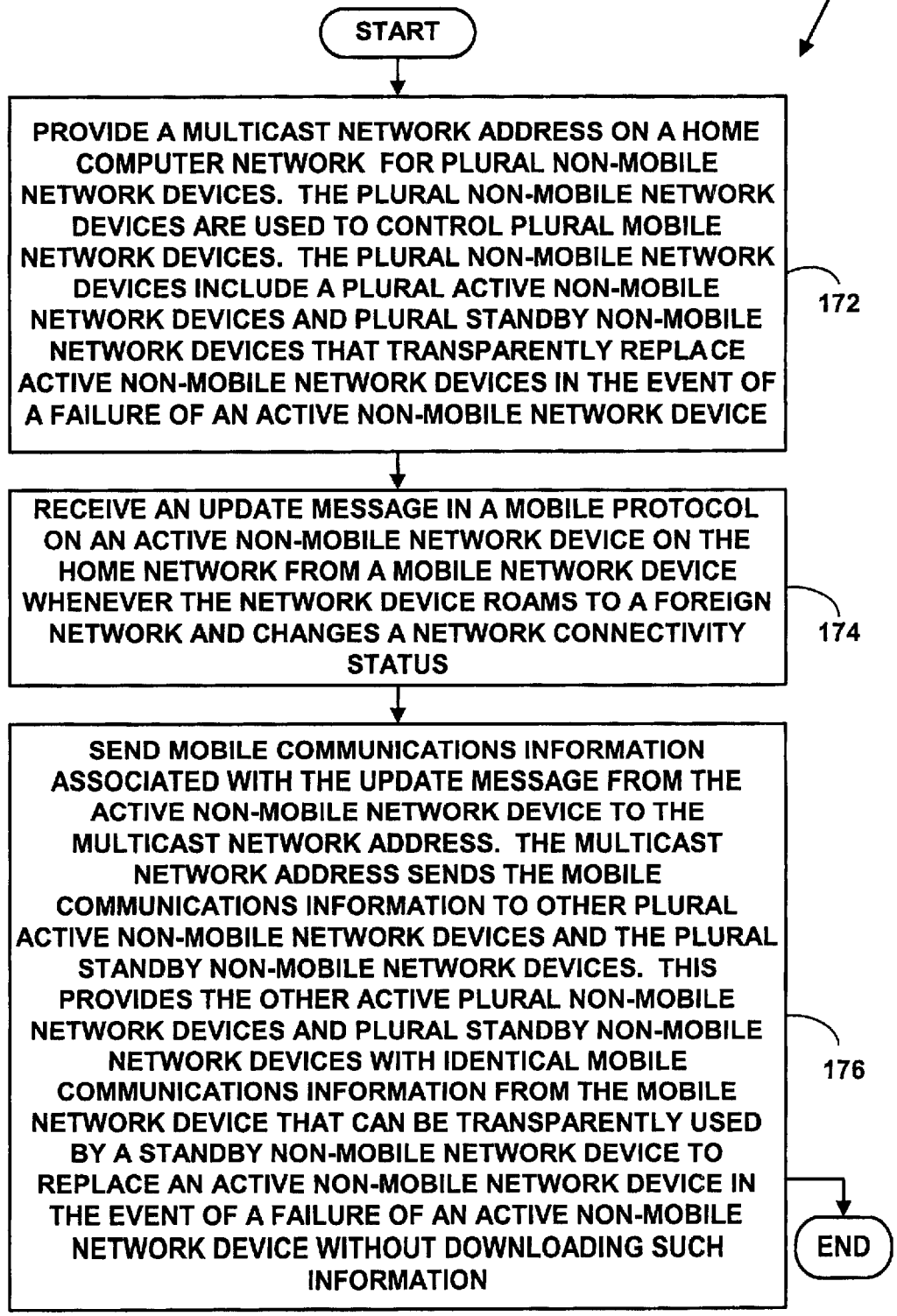

START

↓

RECEIVE AN IDENTIFIER WITH A RESOLUTION PROTOCOL A ON STANDBY NON-MOBILE NETWORK DEVICE FROM AN ACTIVE NON-MOBILE NETWORK DEVICE CONTROL NODE FOR AN ACTIVE NON-MOBILE NETWORK DEVICE THAT HAS FAILED ON A HOME NETWORK — 180

↓

DETERMINE ON THE STANDBY NON-MOBILE NETWORK DEVICE WHICH ACTIVE COMMUNICATIONS THE STANDBY NON-MOBILE NETWORK DEVICE WILL TAKE OVER USING THE IDENTIFIER AND MOBILE COMMUNICATIONS INFORMATION MULTICAST TO THE STANDBY NON-MOBILE NETWORK DEVICE VIA A MULTICAST NETWORK ADDRESS ON THE HOME NETWORK. THE MOBILE COMMUNICATIONS INFORMATION INCLUDES MOBILE COMMUNICATION INFORMATION FOR MOBILE NETWORK DEVICES THAT HAVE ROAMED AWAY FROM THE HOME NETWORK. — 182

↓

DELETE MOBILE COMMUNICATIONS INFORMATION ON THE STANDBY NON-MOBILE NETWORK DEVICE THAT IS NOT RELEVANT TO THE ACTIVE COMMUNICATIONS THE STANDBY NON-MOBILE NETWORK DEVICE WILL TAKE OVER FROM THE ACTIVE NON-MOBILE NETWORK DEVICE THAT HAS FAILED, THEREBY CREATING A SET OF OPTIMIZED MOBILE COMMUNICATIONS INFORMATION — 184

↓

SYNCHRONIZE THE STANDBY NON-MOBILE NETWORK DEVICE WITH THE ACTIVE NON-MOBILE NETWORK DEVICE CONTROL NODE WITH A RESOLUTION PROTOCOL TO UPDATE ANY OPTIMIZED MOBILE COMMUNICATIONS INFORMATION ASSOCIATED WITH THE ACTIVE COMMUNICATIONS THE STANDBY NON-MOBILE COMMUNICATIONS DEVICE WILL TAKE OVER THAT NEEDS UPDATING, IF ANY — 186

↓

CHANGE THE STATUS OF THE STANDBY NON-MOBILE NETWORK DEVICE FROM STANDBY TO ACTIVE TO CREATE A NEW ACTIVE NON-MOBILE NETWORK DEVICE, THEREBY TRANSPARENTLY REPLACING THE ACTIVE NON-MOBILE NETWORK DEVICE THAT HAS FAILED WITH THE STANDBY NON-MOBILE NETWORK DEVICE ON THE HOME NETWORK — 188

↓

END

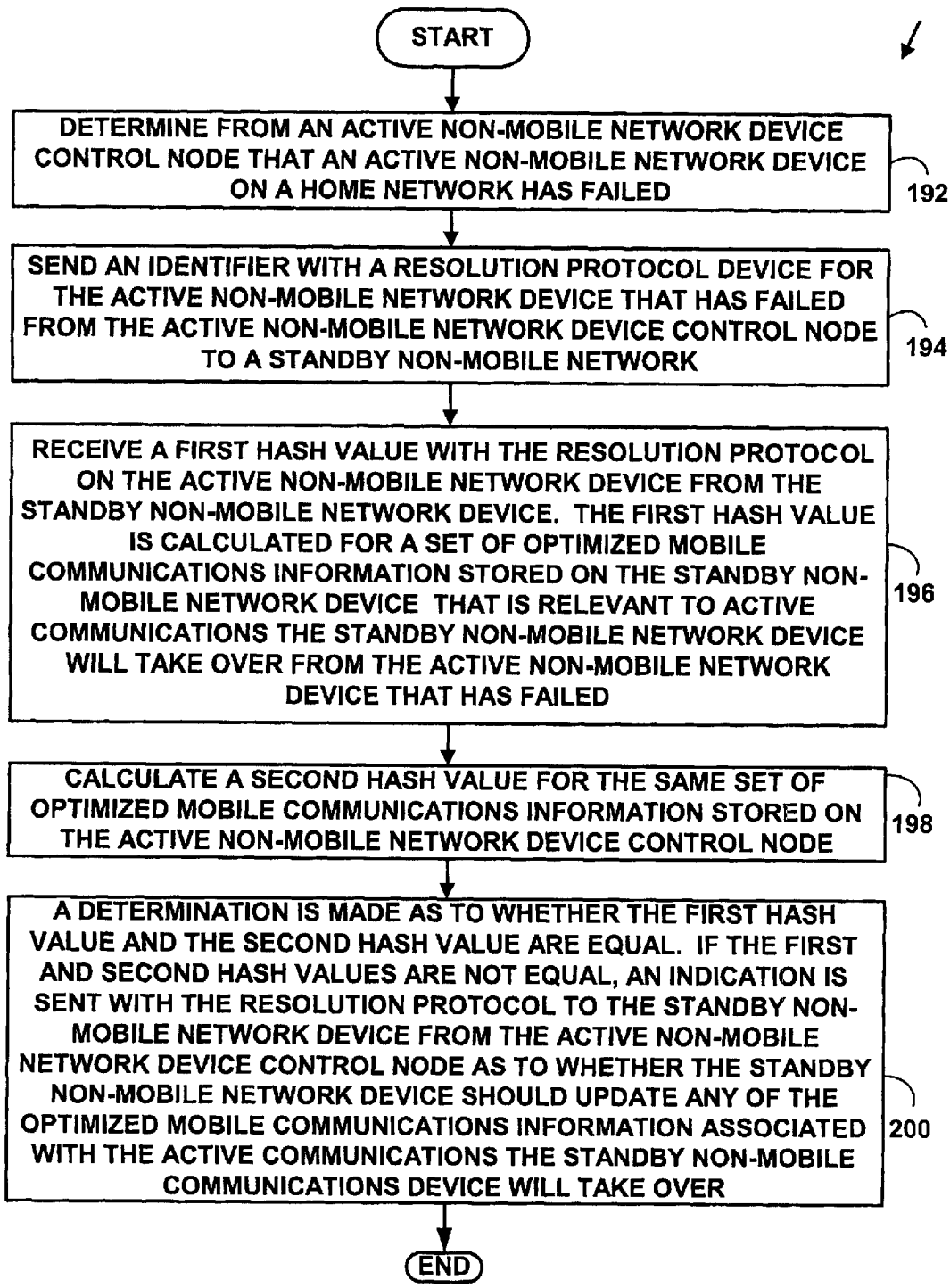

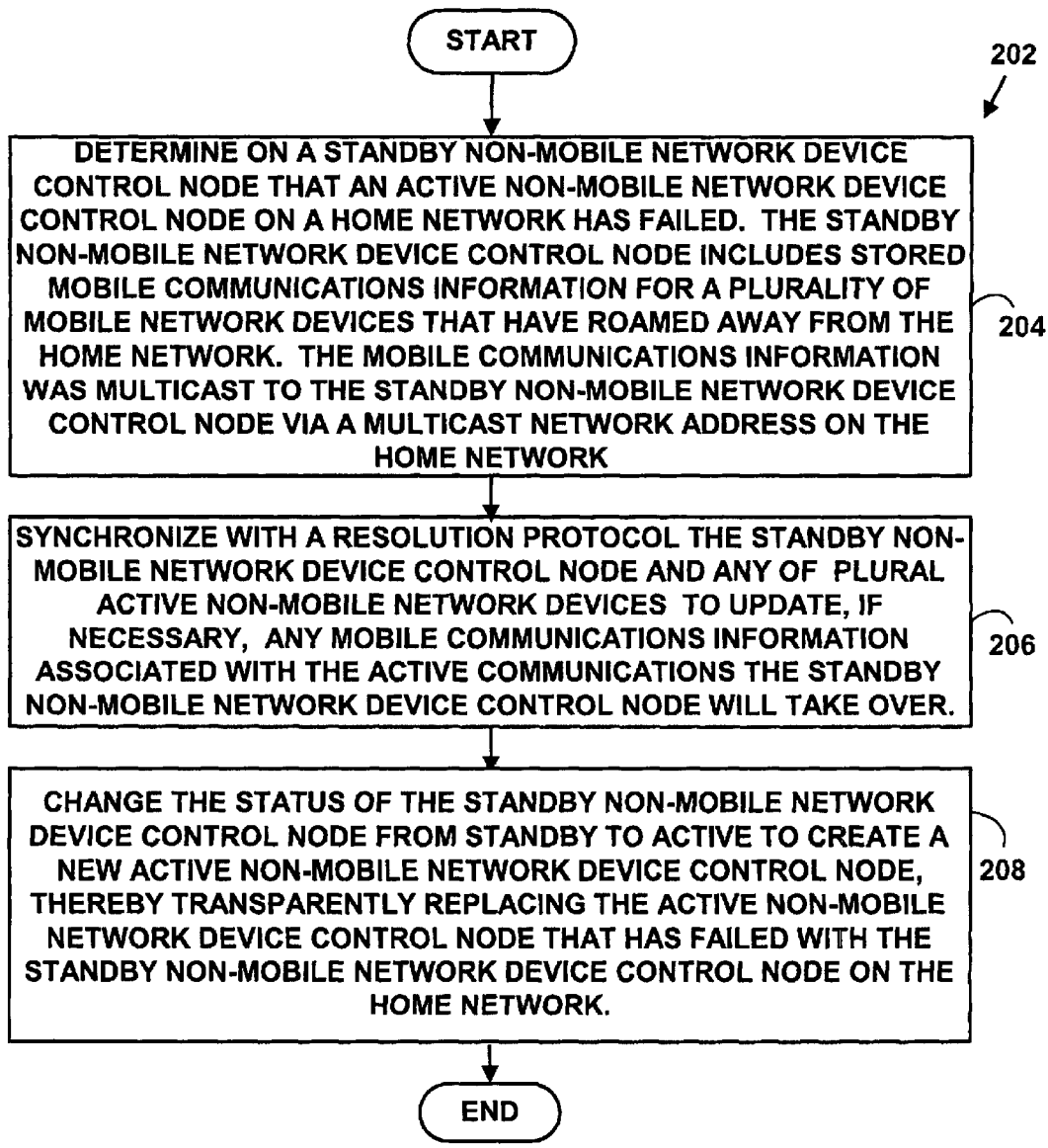

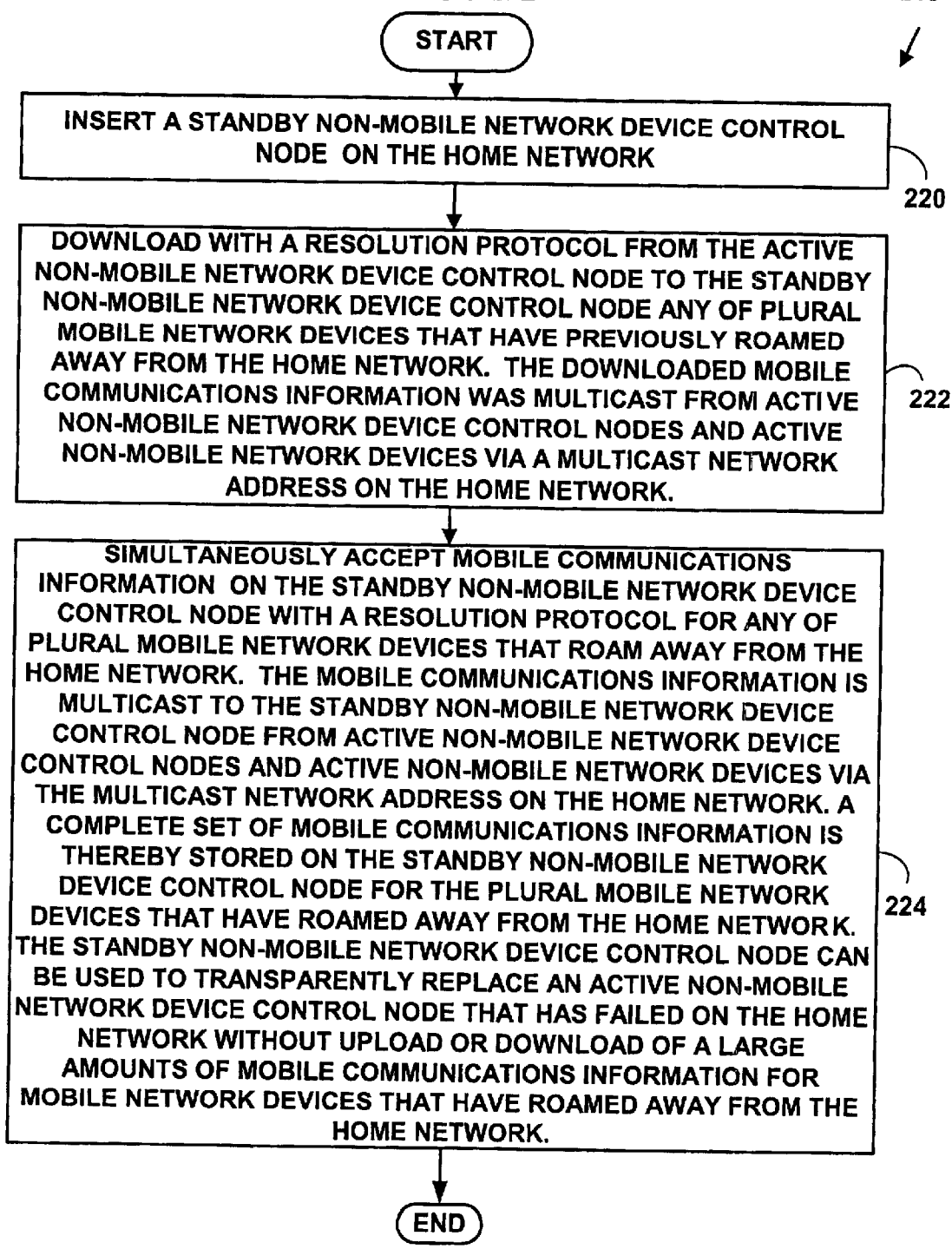

METHOD AND SYSTEM FOR MOBILE IP HOME AGENT REDUNDANCY BY USING HOME AGENT CONTROL NODES FOR MANAGING MULTIPLE HOME AGENTS

FIELD OF INVENTION

This invention relates to communications on computer networks. More specifically, it relates to a method and system for mobile internet Protocol home agent redundancy.

BACKGROUND OF THE INVENTION

The Internet Protocol ("IP") is an addressing protocol designed to route traffic within a network or between networks. The Internet Protocol is used on many computer networks including the Internet, intranets and other networks. Internet Protocol addresses are typically assigned to "immobile" nodes on a network. An immobile node may be moved to a different computer network, but is typically associated with a static physical location (e.g., 3Com Corporation in Santa Clara, Calif.) and an immobile Internet protocol address.

The Mobile Internet Protocol (hereinafter Mobile IP) allows "mobile" nodes to transparently move between different Internet Protocol sub-networks ("subnets"). Internet Protocol addresses are typically assigned to mobile nodes based on their home Internet Protocol subnet. The home subnet is connected to an external network (e.g., the Internet or an intranet) with a "home agent" that serves as the subnet's gateway router. As is known in the art, the gateway connects computer networks using different networking protocols or operating at different transmission capacities. As is known in the art, a router translates differences between network protocols and routes data packets to an appropriate network node or network device.

When a mobile node "roams," (i.e., dynamically changes its physical location), it periodically transmits "agent solicitation" messages to other gateway routers. A mobile node also listens for "agent advertisement" messages from other gateway routers. When a mobile node receives an agent advertisement message indicating that it is now on a foreign subnet, it registers with the foreign gateway router or "foreign agent" and its home agent. The registration with the home agent indicates the mobile node is away from "home" (i.e., away from its home subnet). The registration with the foreign agent allows the mobile node to receive data on the foreign subnet.

The Mobile Internet Protocol allows a mobile node to dynamically change its network connectivity in a manner that is transparent to protocol layers above the Internet Protocol layer. For example, without re-establishing Transmission Control Protocol or User Datagram Protocol sessions.

As is known in the art, Transmission Control Protocol ("TCP") and User Datagram Protocol ("UDP") are often used over IP in computer networks. Transmission Control Protocol provides a connection-oriented, end-to-end reliable protocol designed to fit into a layered hierarchy of protocols that support multi-network applications. User Datagram Protocol provides a transaction oriented datagram protocol, where delivery and duplicate packet protection are not guaranteed.

It is often desirable to establish a voice, video and/or data call from a mobile node that has roamed from its home network to a foreign network. Such a voice video or data call is typically established using call control and other protocols such as Session Initiation Protocol ("SIP"), H.323, Authentication Authorization and Accounting ("AAA") (e.g., for billing), Domain Name System ("DNS") (e.g., for IP address decoding, etc.).

A mobile node registers with its home agent using a Mobile IP Registration Request message. As a result, its home agent can create or modify a mobility binding record ("MBR") for that mobile node. A mobility binding record is used to keep track of mobile communications information such as a home network address of a mobile node on a home network, a care-of address for the mobile node on a foreign network, a lifetime timer for the association between the home network address and the care-of-network address, and other type mobile communications information.

However, there are several problems associated with managing mobility binding records for Mobile IP. One problem is a Mobile IP home agent may fail. If a Mobile IP home agent fails, then a standby home agent can take over from the failed home agent. However, the time required to complete a mobility binding record upload or download from the home network to a standby home agent for just one failed home agent currently servicing its maximum number of calls (e.g., about 10,000), can be in the range of ten or more minutes. This large time period can lead to a large number of failed calls due to timeouts and other problems and also cause significant user dissatisfaction. Another problem is that uploading or downloading large numbers of mobility binding records to a standby home agent can also cause significant network congestion leading to additional failed calls for other active home agents, especially if multiple home agents fail at the same time.

Another problem is that in many Mobile IP systems, home agents are managed by home agent control nodes. A home agent control node typically manages multiple home agents. If a home agent control node is managing multiple home agents and the home agent control node fails, thousands or perhaps tens of thousands of calls may fail.

For example, if a home agent control node is managing 14 home agents, and each home agent is operating near its maximum number of calls (e.g., 10,000 calls per home agent or about 140,000 calls per home agent control node), and the home agent fails, it could take hours to upload or download the hundreds or thousands of mobility binding records to a standby home agent control node from the individual home agents on the home network to allow the standby home agent to take over. The upload or download to a standby home agent control node can also lead to a large number of failed calls, significant user dissatisfaction or significant network congestion.

This it is desirable to provide a method to for transparently switching between active and standby home agents and active and standby home agent control nodes in a system with mobile devices. The transparent switching should be accomplished without downloading or uploading large numbers of mobility binding records.

SUMMARY OF THE INVENTION

In accordance with preferred embodiments of the present invention, some of the problems associated with transparently switching between active and standby home agents and active and standby home agent control nodes are overcome. A method and system for non-mobile network device redundancy is presented.

One aspect of the invention includes a method for switching between active and standby non-mobile network devices (e.g., home agents) on a home network for mobile nodes. Another aspect of the invention includes a method for switching between active and standby non-mobile network device control nodes (e.g., home agent control nodes) on a home network for mobile nodes. Another aspect of the invention includes a method for inserting a standby non-mobile network device (e.g., home agent) on a home network for mobile nodes. Another aspect of the invention includes a method for inserting a standby non-mobile network device control node (e.g., home agent control node) on a home network for mobile nodes. Another aspect of the invention includes a resolution protocol for inserting or transparently switching between active and standby non-mobile network devices or active and standby non-mobile network device control nodes.

The method and system may help reduce failed calls in Mobile IP systems by eliminating or significantly reducing uploads and/or downloads of large numbers of mobility binding records. The method and system may also improve user dissatisfaction and reduce network congestion in Mobile IP systems.

The foregoing and other features and advantages of embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein:

FIG. 7 is a flow diagram illustrating a method for reducing communication failures for mobile network devices;

FIG. 8 is a flow diagram illustrating a method for switching between active and standby non-mobile network devices on a home network for mobile network devices;

FIG. 9 is a flow diagram illustrating a method for switching between active and standby non-mobile network devices on a home network for mobile network devices;

FIG. 10 is a flow diagram illustrating a method for switching between active and standby non-mobile network device control nodes on a home network for mobile network devices;

FIG. 12 is a method for later inserting a standby non-mobile network device control node on a home network for mobile network devices.

DETAILED DESCRIPTION OF PREFERRED EMBODIMENTS

Exemplary Network System

Figure 1:
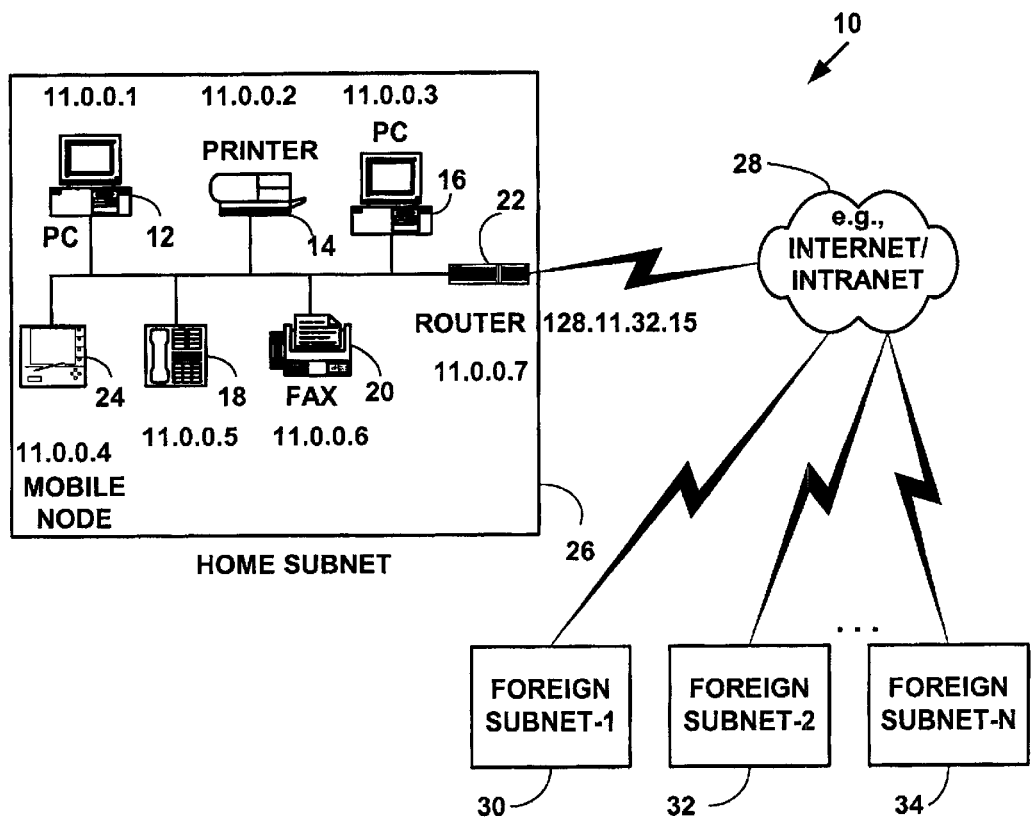
FIG. 1 is a block diagram illustrating an exemplary network system.

FIG. 1 is a block diagram illustrating an exemplary network system 10 for preferred embodiments of the present invention. The network system 10 includes one or more local network devices 12, 14, 16, 18, 20, 22, 24, seven of which are illustrated. However, more or fewer local network devices can also be used. The local network devices are assigned network addresses (e.g., 11.0.0.x) on a local subnet 26 as is illustrated in FIG. 1. The local subnet 26 includes but is not limited to, a wireless netwbrk, a wired network, a wireless or wired LAN, an optical network or a cable network. However, other computer networks can also be used.

The local subnet 26 is connected to an external network 28 such as the Internet or an intranet via gateway router 22. As is known in the art, a gateway connects computer networks using different networking protocols or operating at different transmission capacities. As is known in the art, a router translates differences between network protocols and routes data packets to an appropriate network node or network device. Local network devices on the local subnet 26 can reach one or more remote network devices on foreign subnets 30, 32, 34, via the external network 28.

Figure 3:
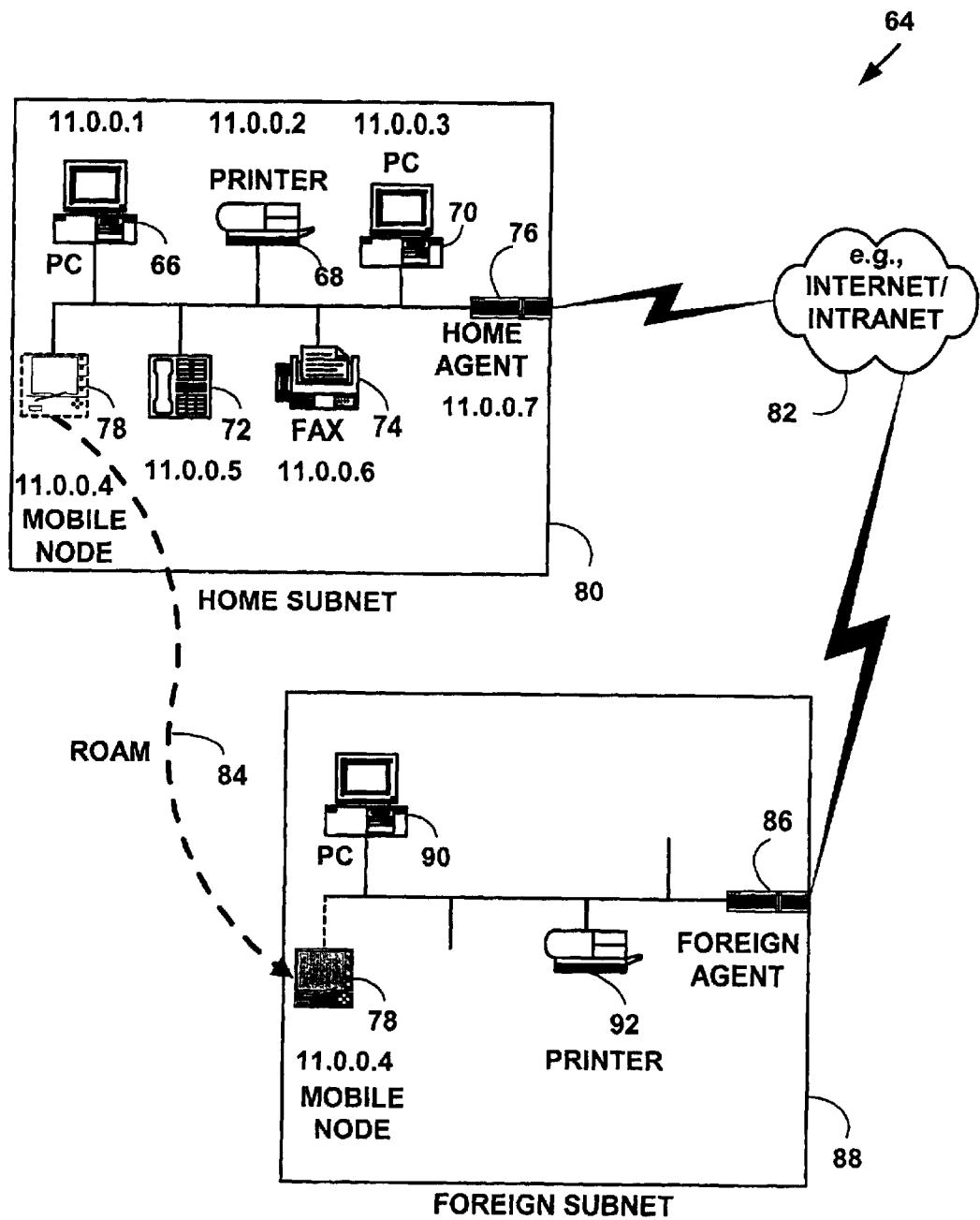
FIG. 3 is a block diagram illustrating an exemplary Mobile Internet Protocol system.

Network devices for preferred embodiments of the present invention include network devices that can interact with network system 10 and the exemplary mobile network system of FIG. 3 based on all or selected portions of standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications tJnion-Telecommunication Standardization Sector ("ITU"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." IETF standards can be found at the URL "www.ietf.org." The WAP standards can be found at the URL "www.wapforum.org."

An operating environment for network devices and routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed," or "processor-executed."

It will be appreciated that acts and symbolically represented operations or instructions include the manipulation of electrical signals or biological signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary Protocol Stack

Figure 2:
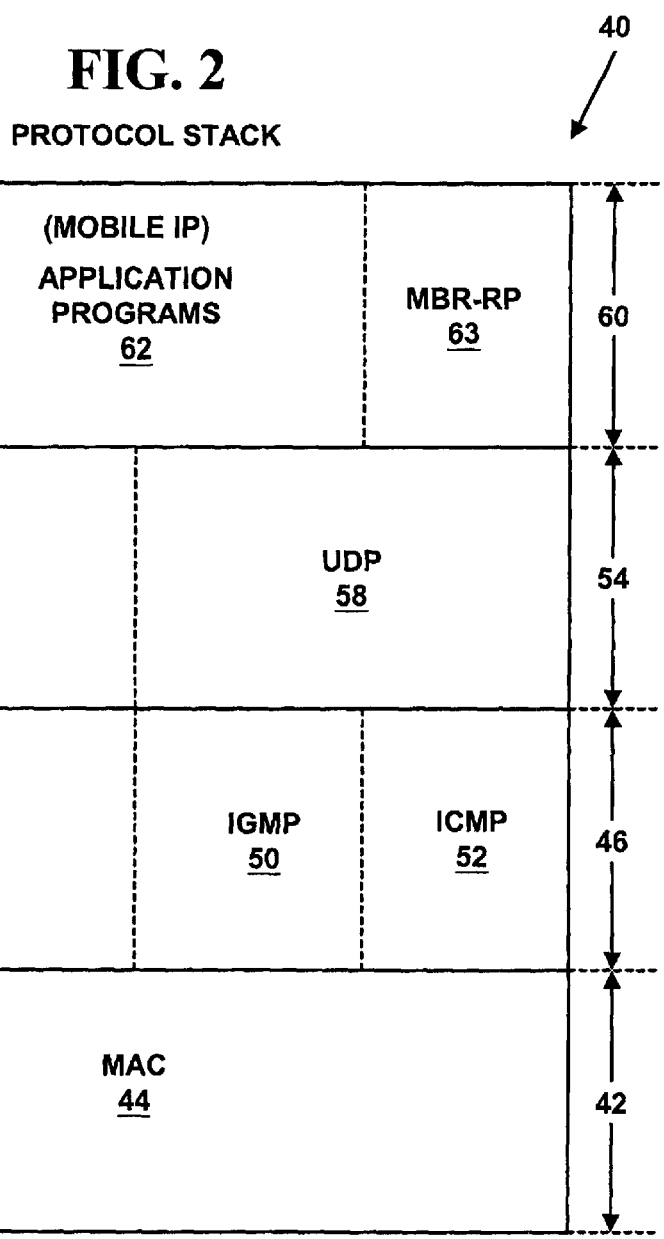
FIG. 2 is a block diagram illustrating a protocol stack for network devices.

FIG. 2 is a block diagram illustrating an exemplary layered protocol stack 40 for network devices from the exemplary network system 10 (FIG. 1) and the exemplary mobile network system of FIG. 3. The layered protocol stack 40 is described with respect to Internet Protocol suites comprising from lowest-to-highest, a link, network, transport and application layer. However, more or fewer layers could also be used, and different layer designations could also be used for the layers in the protocol stack 40 (e.g., layering based on the seven layer Open Systems Interconnection ("OSI") model).

The layered protocol stack 40 is used to connect a network device to an underlying physical transmission medium comprising a wireless network, wired network, wireless or wired LAN, an optical network or a cable network. However, other computer networks can also be used and the present invention is not limited to these networks. The underlying physical transmission medium is also called a physical layer (not illustrated in FIG. 2). As is known in the art, a physical layer defines the electrical and physical properties of an underlying transmission medium.

A link layer 42 is used to connect network devices to the underlying physical transmission medium or physical layer. The link layer 42 includes a Medium Access Control ("MAC") protocol layer 44. As is known in the art, the MAC layer 44 controls access to the underlying transmission medium via a physical layer. For more information on the MAC layer protocol see IEEE 802.3, incorporated herein by reference. However, the present invention is not limited to a MAC layer protocol 44 in the link layer 42 and other link layer protocols can also be used. (e.g., other IEEE 802.x protocols).

Above the link layer 42 is a network layer 46 (also called the "Internet Layer" for Internet Protocol suites). The network layer 46 includes an IP layer 48. As is known in the art, IP 48 is an addressing protocol designed to route traffic within a network or between networks. IP layer 48, hereinafter IP 48, is described in IETF RFC-791, incorporated herein by reference. Support for Mobile IP is also included in the application layer 60.

The network layer 46 also includes an Internet Group Management Protocol ("IGMP") layer 50, an Internet Control Message Protocol ("ICMP") layer 52. IGMP layer 50, hereinafter IGMP 50, is responsible for multicasting. For more information on IGMP 50, see IETF RPC-1112, incorporated herein by reference. ICMP layer 52, hereinafter ICMP 52, is used for Internet Protocol control. The main functions of ICMP 52 include error reporting, reachability testing (e.g., "pinging"), route-change notification, performance, subnet addressing and other maintenance. For more information on ICMP 52 see IETF RFC-792, incorporated herein by reference. ICMP 52 can be used without IGMP 50 and both ICMP 52 and IGMP 50 are not required in protocol stack 40.

The network layer 46 may also include a Generic Routing Encapsulation ("GRE") layer (not illustrated). As is known in the art, GRE is protocol for performing encapsulation of an arbitrary network layer protocol over another arbitrary network layer protocol. For more information on GRE see IETF RFC-1701–1702, incorporated herein by reference.

Above network layer 46 is a transport layer 54. The transport layer 54 includes a Transmission Control Protocol ("TCP") layer 56 and/or a User Datagram Protocol ("UDP") layer 58.

The TCP layer 56, hereinafter TCP 56, provides a connection-oriented, end-to-end reliable protocol designed to fit into a layered hierarchy of protocols which support multi-network applications. TCP 56 provides for reliable inter-process communication between pairs of processes in network devices attached to distinct but interconnected networks. For more information on TCP 56 see IETF RFC-793, incorporated herein by reference.

The UDP layer 58, hereinafter UDP 58, provides a connectionless mode of cominuiications with datagrams in an interconnected set of computer networks. UDP 58 provides a transaction oriented datagram protocol, where delivery and duplicate packet protection are not guaranteed. For more information on UDP 58 see IETF RFC-768, incorporated herein by reference. Both TCP 56 and UDP 58 are not required in protocol stack 40. Either TCP 56 or UDP 58 can be used without the other.

Above the transport layer 54 is an application layer 60 including application programs 62. The application programs 62 provide desired functionality to a network device (e.g., telephony or other communications functionality). For example, application programs 62 may provide voice, video, audio, data or other applications. The application layer 60 may also include application layer protocol layers. Application layer protocol layers typically provide a subset of the functionality provided by an application program.

In one embodiment of the present invention, the application layer 60 includes a Dynamic Host Configuration Protocol ("DHCP") application program 62 or application protocol layer. DHCP is a protocol for passing configuration information such as IP 48 addresses to network devices on an IP 48 network and other networks. For more information on DHCP see, RFC-1541, and RFC-2131 and RFC-2132, incorporated herein by reference.

The application layer 60 may also include a Service Location Protocol ("SLP") application program 62 or application protocol layer. As is known in the art, SLP provides a scalable framework for the discovery and selection of network services. Using SLP, network devices using the Internet need little or no static configuration of network services for network based applications. For more information on SLP see IETF RFC-2608, incorporated herein by reference.

The application layer 60 may also include a Session Initiation Protocol ("SIP") application program 62 or application protocol layer. As is known in the art, the SIP is an application-layer 60 control (signaling) protocol for creating, modifying and terminating sessions with one or more participants. These sessions include Internet multimedia conferences, Internet telephone calls (e.g., Voice over IP, "VoIP") and multimedia distribution. Members in a session can communicate via multicast or via a mesh of unicast relations, or a combination of these. SIP invitations used to create sessions carry session descriptions, which allow participants to agree on a set of compatible media types.

SIP supports user mobility by proxying and redirecting requests to a mobile network device's current location. Mobile network devices can register their current location. SIP is not tied to any particular conference control protocol.

SIP is designed to be independent of a lower-layer transport protocol and can be extended. For more information on SIP, see IETF RFC-2543, "SIP: Session Initiation Protocol", the contents of which are incorporated by reference.

The application layer 60 may also include an ITU-T H.323 or H.324 application programs 62 or application protocol layers. As is known in the art, H.323 is the main family of video conferencing recommendations for Internet Protocol ("IP") networks. The ITU-T H.323 standard is incorporated herein by reference. As is known in the art, H.324 is a video conferencing recommendation using plain-old-telephone-service ("POTS") lines. The ITU-T H.324 standard is incorporated by reference.

The application layer 60 may also include a VoIP application program 62 or application protocol layer. VoIP typically comprises several application programs 62 (e.g., H.323, SIP, AAA, etc.) that convert a voice signal into a stream of packets (e.g., IP 48 packets) on a packet network and back again. VoLP allows voice signals to travel over a stream of packets.

VoIP services typically need to be able to connect to traditional circuit-switched voice networks. VOTP is typically used with the H.323 protocol and other multimedia protocols. H.323 terminals such as multimedia computers, handheld devices, personal digital/data assistants ("PDA") or other devices such as mobile phones connect to existing wired and wireless PSTN as well as private wired and wireless networks.

H.323 terminals are typically LAN-based end points for voice transmission. H.323 terminals typically support real-time, two-way voice communications. H.323 terminals implement voice transmission functions and typically include at least one voice Compressor/Decompressor ("CODEC") that sends and receives packetized voice (e.g., ITU-T CODECS, G.711, G.723, G.726, G.728, G.729, etc.).

The application layer 60 may also include a Domain Name System ("DNS") application program 62 or application protocol layer. As is known in the art, the DNS provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated by reference.

The application layer 60 may also include an Authentication Authorization and Accounting ("AAA") application program 62 or application protocol layer. As is known in the art, AAA includes a classification scheme and exchange format for accounting data records (e.g., for call billing, etc.). For more information on AAA applications, see, "Accounting Attributes and Record Formats," IETF RFC-2924, the contents of which are incorporated by reference.

Other examples, of AAA applications include, but are not limited to, "Remote Authentication Dial In User Service (RADIUS)" described in IETF RFC-2865, the DIAMETER protocol, which is used for AAA for Mobile-IP, described in IETF draft <draft-calhoun-diameter-impl-guide-04.txt> entitled "DIAMETER Implementation Guidelines," July 2000, and IETF draft <draft-calhoun-diameter-mobileip-11.txt>, entitled "DIAMETER Mobile UP Extensions," September 2000, the contents of all of which are incorporated by reference. However, the present invention is not limited to these protocols, and other or equivalent AAA protocols can also be used.

The application layer 60 may also include a Simple Network Management Protocol ("SNMP") application program 62 or application protocol layer. SNMP is used to support network management functions. For more information on SNMP layer 62 see IETF RFC-1157, incorporated herein by reference.

The application layer 60 may also include a Mobile Boot Record Resolution Protocol ("MBR-RP") application program 63 or application protocol layer. The MBR-RP 63 may be a separate, standalone protocol, or it may be included as an extension or option within the DHCP, SNMP, SLP, SIP, AAA, H.323, or other protocols. In another embodiment of the present invention, the MBR-RP is a network layer protocol. In yet another embodiment of the present invention, the MBR-RP is included as an extension or option within the IP 48 and/or UDP 50 protocols.

If the MBR-RP protocol is used a separate, standalone protocol, it includes data packets with a header portion and a data payload portion. The header portion is used to header may include, but is not limited to, a packet identification number, source and destination addresses, source and destination ports, error-control data, shared secrets or other security components and other information, in plural header fields. The data payload portion may include, but is not limited to, Mobile IP mobility binding record information as is explained below (e.g., see Table 1).

In one embodiment of the present invention, one or more application programs 62 may be included in a network device, which also act as an application server. In another embodiment of the present invention, application programs 62 may be included in stand-alone application servers (e.g., SIP servers, H.323 servers, AAA servers, DNS servers, MBR-RP servers, VoIP servers, etc.). In such an embodiment, network devices may include only an application program layer (e.g., SIP) that communicates with an application program (e.g., SIP) running on the stand-alone application server to provide application functionality. However, the present invention is not limited to such embodiments, and other or equivalent embodiments could also be used.

Mobile IP

Mobile IP allows "mobile" nodes to transparently move between different IP sub-networks ("subnets"). Mobile IP allows a mobile node to dynamically change its network connectivity in a manner that is transparent to protocol layers above the network layer 46 (e.g., TCP 56 or UDP 58). For more information on Mobile IP see "Mobile IP: The Internet Unplugged," by J. D. Solomon, Prentice-Hall, 1998, ISBN-0-13-856246-6. See also Mobile IP, as defined by IETF RFCs 2002–2006, all of which are incorporated herein by reference. In a preferred embodiment of the present invention, support for Mobile IP is included the application layer 62 (FIG. 2).

FIG. 3 is a block diagram illustrating an exemplary Mobile IP system 64. The Mobile IP system 64 includes one or more "immobile" network devices 66, 68, 70, 72, 74, 76, six of which are illustrated, and a mobile network device 78, only one of which is illustrated. Hereinafter the mobile network device 78 is called "mobile node 78." However, Mobile IP System 64 typically includes hundreds or thousands of mobile nodes. More or fewer immobile network devices or more mobile network devices can also be used. The immobile network devices 66, 68, 70, 72, 74, 76, and the mobile node 78 are assigned a network addresses such as IP 48 addresses on a Home Subnet ("HS") 80 as is illustrated in FIG. 3. The home subnet 80 includes but is not limited to, a wireless network, a wired LAN, an optical network or a cable network. However, other computer networks can also be used home subnet 80. The home subnet 80 is connected to an external network 82 such as the Internet or an intranet via a home agent ("HA") 76. The home agent 76 typically is a "gateway router" for the home subnet 80.

When mobile node 78 "roams" 84 away from its home subnet 80, it periodically transmits Mobile IP "agent solicitation" messages to foreign agents, such as foreign agent ("FA") 86 (i.e., foreign with respect to home subnet 80), via external network 82. The foreign agent 86 resides on a foreign subnet 88 with one or more foreign immobile network devices 90, 92, only two of which are illustrated. The foreign subnet 88 may also include one or more mobile nodes (not illustrated in FIG. 3). The foreign agent 86 is a gateway router for the foreign subnet 88. The foreign immobile network devices 90, 92 are assigned network addresses (e.g., IP 48 addresses) on the foreign subnet 88 as is illustrated in FIG. 3. (e.g., 12.0.0.x).

Roaming mobile node 78 listens for Mobile IP "agent advertisement" messages from foreign agents (i.e., foreign gateway routers such as foreign agent 86). When roaming mobile node 78 receives an agent advertisement message from a foreign agent indicating that it is now on a foreign subnet (e.g., foreign subnet 88), mobile node 78 registers with the foreign agent (e.g., foreign agent 86) and its home agent (e.g., home agent 76) indicating that the mobile node 78 has roamed 84 away from its home subnet 80.

As is illustrated in FIG. 3, the mobile node 78 has a network address (e.g., IP 48 address) of 11.0.0.4 on the home subnet 80. The home agent 76 has a network address of 11.0.0.7 on the home subnet 80. The mobile node 78 with network address 11.0.0.4, belongs to the home subriet 80 typically with network access prefix of 11.0.0 and a prefix length of 24 bits (i.e., 11.0.0.X/24). Network devices on the home subnet 80 have network addresses beginning with the network access prefix of 11.0.0 and a prefix length of 24 bits. Since the home agent 76 is advertising a route to the home subnet 80 at 11.0.0.X/24, it will accept data packets from external network 82 for network addresses with the network access prefix 11.0.0.X/24. For example, the home agent 76 accepts data packets for the mobile node 78 that has a home network address of 11.0.0.4, where X=4 since the network access prefix is equal to 11.0.0 with a length of 24-bits.

Triangular Routing for a Mobile Node

Figure 4:
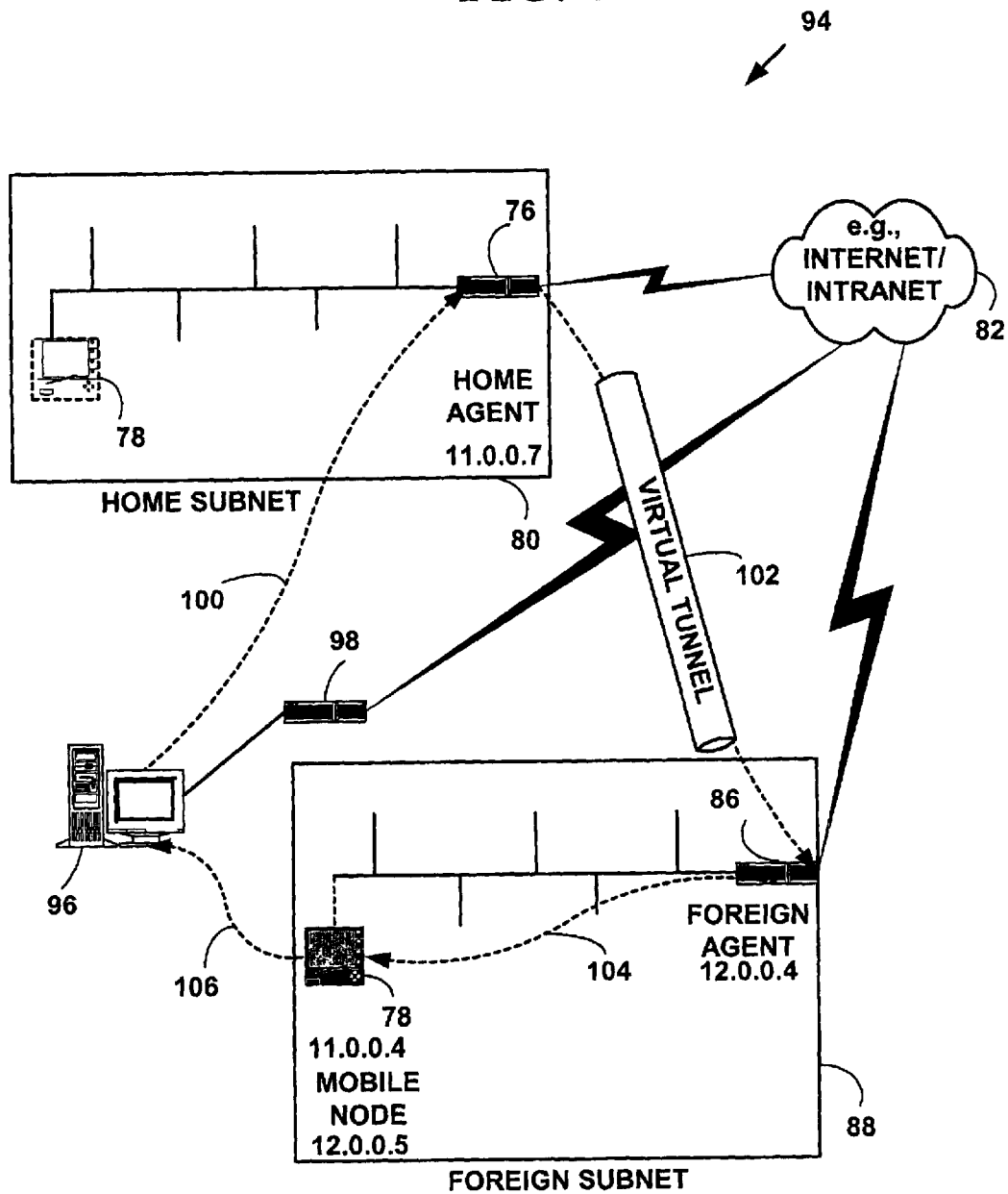
FIG. 4 is a block diagram illustrating triangular communications on an exemplary Mobile Internet Protocol system.

FIG. 4 is a block diagram illustrating exemplary Mobile IP communications in an exemplary Mobile IP system 94. Round-trip routing to and from the mobile node 78 is typically asymmetric and follows a triangular path. A "virtual" triangular routing path is illustrated in FIG. 4 with dashed lines. However, the actual routing path is accomplished between the home subnet 80 and the foreign subnet 88 using the solid line connections illustrated in FIG. 4 via external network 82.

As is illustrated in FIG. 4, a correspondent 96 with a router 98 receives data packets for the mobile node 78 from the external network 82. The correspondent 96 is, for example, a network access service provider being used by mobile node 78, or any other host device on the external network 82 (e.g., an edge router, telecommunications hub, etc.). In FIG. 4, the correspondent 96 sends data packets for the mobile node 78 to the mobile node's home agent 76. Dashed line 100 illustrates a "virtual" data flow pathway between the correspondent 96 and the home agent 76.

Assuming that the mobile node 78 has roamed 84 to the foreign subnet 88 and has registered its current location (e.g., on foreign subnet 88 and on the home subnet 80), the home agent 76 creates a "virtual tunnel" 102 to the foreign agent 86 via external network 82. As is known in the art, a virtual tunnel can be created by encapsulating a data packet inside another data packet by adding additional tunnel packet headers. In one preferred embodiment of the present invention, IP-in-IP tunneling is used. For more information on IP-in-IP tunneling see IETF RFC-1853, incorporated herein by reference. However, other virtual tunnels can also be created (e.g., UDP 58 tunneling or double IP-in-IP tunneling, GRE tunneling, etc.). A reverse virtual tunnel 102 from a foreign agent 86 to home agent 76 eliminates triangular routing. When the foreign agent 86 receives tunneled packets, it may remove the tunnel packet headers and routes 104 them to the mobile node 78, which is currently registered on the foreign network 86.

When the mobile node 78 sends packets to an external destination on external network 82, no tunneling is used. Data packets are transmitted 106 from mobile node 78 to the correspondent 96. Thus, a "virtual" routing triangle is formed as illustrated by the dashed lines in FIG. 4. The virtual routing triangle is a "logical" route rather than a "physical route." The physical route includes routes through external network 82. The correspondent 96 routes the data packets on to the external destination via the external network 82. Thus, the round-trip routing because of its asymmetric triangular path, introduces round-trip time ("RTT") delays for communications with the mobile node 78. The RTT delays may further aggravate communications failures when a home agent or home agent control node fails.

The mobile node 78, the home agent 76, and the foreign agent 86 typically maintain some Mobile IP state information. The mobile node 78 periodically transmits "keep-alive" messages using ICMP 52 messages, including standard ICMP 52 messages, and other messages that are unique to Mobile IP including Mobile IP registration request messages that update lifetime-timers and Mobile IP registration reply messages. Mobile node 78 can roam to foreign subnets other than foreign subnet 88 and register with other foreign agents using Mobile IP.

Third Generation Mobile Architecture

Third-generation ("3G") architecture, supports, data rates ranging from 144 K bits-per-second to 2 M bits-per-second, ("bps") packet switched services including IP 48 traffic, symmetrical and asymmetrical data rates, multimedia services including video conferencing and streaming video, international roaming among different 3G operating environments. 3G includes packet-based transmission of digitized voice, data and video. 3G networks encompass a range of wireless technologies including Code Division Multiple Access ("CDMA"), Universal Mobile Telecommunications Service ("UMTS") Wide-band CDMA ("WCDMA") and others.

As is known in the art, CDMA is a digital communications technology that uses spread-spectrum communication techniques. CDMA does not assign a specific frequency to each user. Instead, every CDMA communications channel can use the full available communications spectrum. Individual conversations are encoded with a pseudo-random digital sequence.

As is known in the art, UMTS is a 3G mobile technology that delivers broadband information at speeds up to 2 M bps. Besides voice and data UMTS delivers audio and video to wireless devices anywhere in the world through fixed, wireless and satellite systems.

The ITU-T guidelines for 3G networks are included in the IMT-2000 standard. The ITU-T IMT-2000 standard is incorporated herein by reference.

3G networks implementing IMT-2000 including wireless and cellular network devices allow mobile network devices that can roam from network-to-network to use Mobile IP. Many of these mobile network devices will be wireless phones, PDAs, or similar devices that need to establish, maintain and terminate call sessions. In the current generation of 3G networks, a local proxy is typically used on all foreign networks. A local proxy may be included in the foreign agent 86 or in a stand-alone local proxy server or application program on the foreign network 88.

Figure 5:
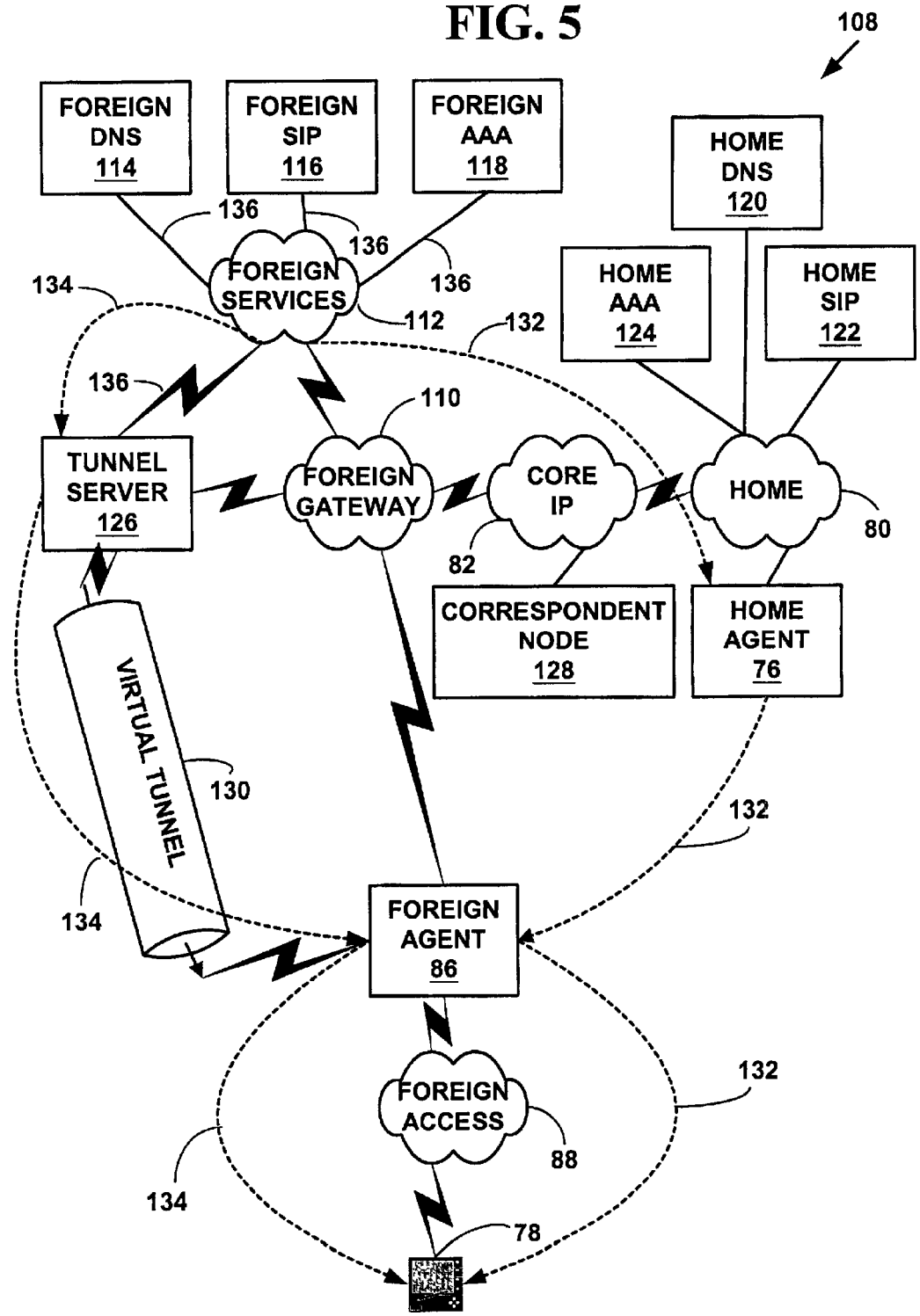
FIG. 5 is a block diagram illustrating an exemplary 3G system.

FIG. 5 is a block diagram illustrating an exemplary 3G system 108. The exemplary 3G system 108 includes a foreign gateway network 110, a foreign services network 112, a foreign DNS application 114, a foreign SIP application 116 and a foreign AAA application 118. The exemplary 3G system 108 also includes a home DNS application 120, a home SIP application 122, a home AAA application 124, a tunnel server ("TS") 126 and a correspondence node ("CN") 128.

However, the present invention is not limited to such an embodiment and more fewer or other components can also be used in 3G system 108. In addition, components such as home DNS application 120, home SIP application 122, home AAA application 124, tunnel server 126 and correspondence node 128 are illustrated as separate components. In other embodiments, all or selected ones of these components may be combined into a single or smaller number of components (e.g., into home agent 76, etc.).

The foreign gateway network 110 and foreign services network 112 are illustrated as separate from foreign network 88. For example, the foreign gateway network 110 can include an IP 48 network or other network, the foreign services network 112 can include an IP 48 network, the Public Switched Telephone Network ("PSTN"), a packet data service node ("PDSN"), or other network or network device. In one embodiment of the present invention, the foreign agent 86 includes a PDSN. However, the present invention is not limited to this implementation and other types of foreign agents can also be used. However, the foreign gateway network 110 and the foreign services network 112 can also all be integral to foreign network 88.

In one embodiment of the present invention, the foreign gateway network 110 and the foreign services network 112 are integral to foreign network 88. In another embodiment of the present invention, the foreign network 88, foreign gateway network 110 and foreign services network 112 are separate networks. However, in such an embodiment, the separate foreign networks are collectively referred to as "foreign network 88" for the sake of simplicity.

The exemplary 3G system 108 includes a virtual tunnel 130, a default communications path 132 a new communications path 134, and a tunnel server communications path 136. The default communications path 132 includes a communications path from the foreign services applications 114, 116, 118 on a foreign network, to the home agent 76 on the home network 80, to the foreign agent 86 on the foreign network 88 and to the mobile node 78 on the foreign network 88. The new communications path 134 includes a communications path from the foreign services applications 114, 116, 118, to the tunnel server 126 on a foreign network, to the foreign agent 86, and to the mobile node 78 on the foreign network 88. The tunnel server communications path 136 includes a communications path between the foreign service applications 114, 116, 118 and the tunnel server 126.

The exemplary 3G system 108 also includes the home agent 76, mobile node 78, home network 80, external network 82, foreign agent 86 and foreign network 88 as described above (FIG. 3). The home network 80 and the foreign network components include, but are not limited to, a wireless network, a LAN, an optical network or a cable network. However, other equivalent high-speed computer networks can also be used. However, the present invention is not limited to the exemplary 3G system illustrated, and more, fewer or equivalent components can also be used.

In one embodiment of the present invention, the exemplary 3G system 108 includes an all IP 48 network comprising of an IP 48 radio access network ("IP-RAN") 110, 112 and an IP Mobility Core Network 82. These exemplary networks support wireless interface technologies including Global System for Mobile Communications, ("GSM"), Generic Packet Radio Services ("GPRS"), Personal Communications Services ("PCS"), a Cellular Digital Packet Data ("CDPD"), Wireless Application Protocol ("WAP"), Digital Audio Broadcasting ("DAB"), Bluetooth, 802.11a, Wireless LAN, Wifi/802.11b, WCDMA, or other types of wireless network interfaces.

As is known in the art, GSM is another type of digital wireless technology widely used throughout Europe, in Australia, India, Africa, Asia, and the Middle East. GSM is currently not widely used in the United States, but its use is growing. GSM is a wireless platform based on Time Division Multiple Access ("TDMA") to digitize data. GSM includes not only telephony and Short Message Services ("SMS") but also voice mail, call forwarding, fax, caller ID, Internet access, and e-mail.

As is known in the art, TDMA is a communication technology for delivering digital wireless service using time-division multiplexing. TDMA works by dividing a radio frequency into time slots and then allocating slots to multiple calls. Thus, a single frequency can support multiple, simultaneous data channels. SMS is type of communications service for private message communications with another user.

GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, that operating in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network ("PCN") includes various types of packetized cellular data.

As is known in the art, an 802.11b is a short-range wireless network. The IEEE 802.11b standard defines wireless interfaces that provide up to 11 Mbps wireless data transmission to and from wireless devices over short ranges in the 2.4 GHz band.

As is known in the art, 802.11a is an extension to 802.11 that applies to wireless LANs and provides up to 54 Mbps in the 5 GHz band. 802.11a uses an orthogonal frequency division multiplexing encoding scheme. 802.11a is being developed after release of 802.11b.

As is known in the art, Bluetooth is a short-range (e.g., about 10 meters) radio frequency technology aimed at simplifying communications among network devices and between network devices. Bluetooth wireless technology supports both short-range point-to-point and point-to-multipoint connections.

As is known in the art, DAB is compact disk ("CD") quality audio also known as MUSICAM including ISO/IEC 11172-3 (MPEG-1 Audio Layer 11) and ISO/IEC 13818-3 (MPEG-2 Audio Layer 11). DAB supports mono, stereo and dual-channel bilingual programs. It supports different encoded bit-rate options including 8, 16, 24, 32, 40, 48, 56, 64, 80, 96, 112, 128, 144, 160 or 192 kbit/s per channel.

DAB allows Program Associated Data ("PAD") with a variable capacity of a minimum of 667 bits-per-second ("bps") up to 65 kbits/s. DAB can be used for independent data service channels in the form of a continuous stream segmented into 24 milli-second ("ms") logical frames with a data rate of N×8 kbits/s (N×32 kbits/s for some code rates). Typical DAB data services include a traffic message channel, correction data for Digital GPS ("DGPS"), paging and electronic newspaper features. A DAB system may be used to suggest routes to drivers.

In one embodiment of the present invention, the exemplary 3G system 108 is implemented as using equipment from Commworks (a 3Com company, www.commworks.com). For example, the exemplary 3G system 108 can be implemented using a Commworks 3G Data System including a Total Control Communications Hub by 3Com Corporation of Santa Clara, Calif. including a Commworks Total Control 1000 Packet Data Serving Node Card Set, a Steel-Belted RADIUS Advanced Wireless Edition AAA Server, Signaling Control Nodes, Total Control 1000 Home Agent Card set including dual Home Agent Control Nodes, a Commworks 5310 3G Data Systems Manager and a CommWorks 4302 Foreign Agent Control Node. An exemplary Total Control Communications Hub is described in U.S. Pat. No. 5,528,595, granted to Dale M. Walsh et al., and incorporated herein by reference.

However, the present invention is not limited to such an embodiment and the exemplary 3G system 108 could also be implemented using equipment from Cisco Systems of San Jose, Calif., Lucent Technologies of Murray Hill, N.J., Livingston Enterprises, Inc. of Pleasanton, Calif., and Ascend Communications of Alameda, Calif., Motorola, Inc. of Schaumburg, Ill., Nokia Corporation of Helsinki, Finland, Ericsson Corporation of Stockholm, Sweden, and others.

FIG. 5 illustrates only one home agent 76. However, in most implementations plural home agents 76 are used since large numbers of mobile network devices are supported.

Home Agents

Figure 6:
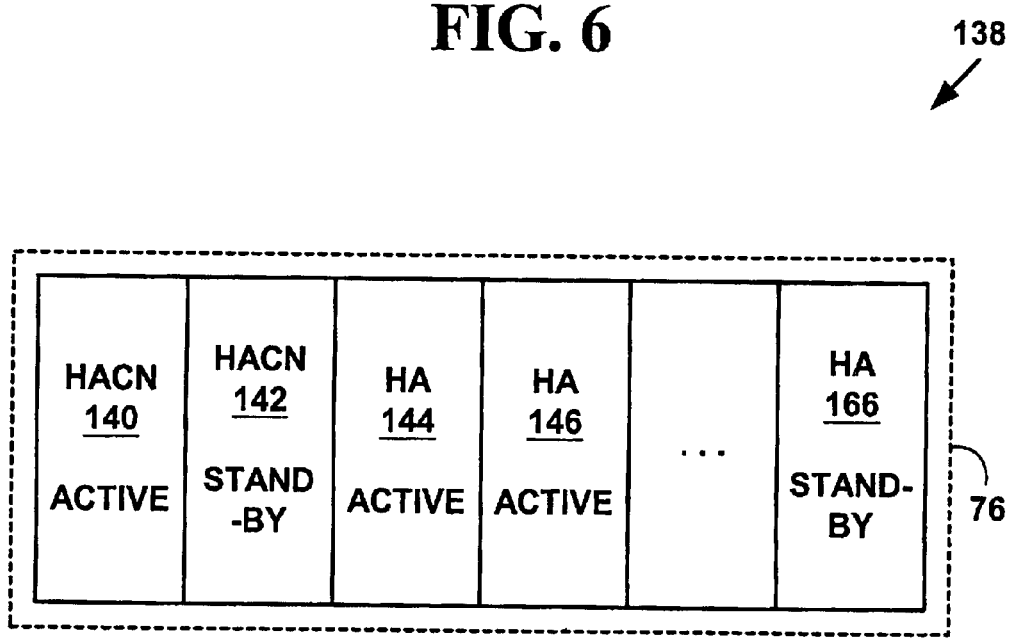
FIG. 6 is a block diagram illustrating an exemplary home agent with plural home agent cards and plural home agent control node cards.

FIG. 6 is a block diagram illustrating an exemplary home agent 138 with plural home agents and plural home agent control nodes used with home agent 76. Home agent 138 includes plural home agent control node cards 140, 142 and plural home agent cards 144–166 in a home agent card chassis. However, the present invention is not limited to such an embodiment for home agent 76, and other embodiments can also be used.

In one embodiment of the present invention, a single point of failure in a mobile data path is eliminated using active and hot-standby home agents and home agent control nodes. This is accomplished deploying at least two home agent control nodes 140, 142 in each chassis of active home agents 144–164 and at least one redundant home agent 166.

Alternatively, x+y redundancy may be achieved by deploying x active home agents and y standby home agents in any combination such that x+y=z, where z is a maximum number of possible home agent units and home agent control node units allowed in a home agent 76 (e.g., home agent cards and home agent control node cards allowed in a home agent chassis).

For example, one version of the ComWorks Total Control 1000 Home Agent Card Set supports up to 14 Home Agent cards in one Total Control 1000 Home Agent Chassis (i.e., multiple active HA's and one or more redundant standby HA) and two or more Home Agent Control Node cards (one active, one redundant standby). Multiple card sets in multiple chassis are typically used to support Mobile IP functionality. Such a home agent cart set in a communication chassis can support up to about 130,000 Mobile IP sessions (or about 10,000 Mobile IP sessions per home agent card). However, the present invention is not limited to ComWorks home agent cards and other types of home agents 76 or home agent cards can also be used, such as those by Cisco, Lucent, Livingston, Ascend, Motorola, Nokia, Ericsson and others.

Home Agent Control Node ("HACN")

In one embodiment of the present invention, pairs of home agent control nodes ("HACNs") 140, 142 are used with plural home agents ("HA") 144–164 and at least one standby HA 166. Typically multiple standby HA 166 (not illustrated) are used. HACNs 140, 142 improve Mobile IP call signaling within the 3G network 108 by providing virtual home agent environments, optimal HA 144–164 selection, HA hot switch-over capabilities, and redundant MBR storage. One HACN is typically active 140, while a second HACN 142 is used for hot-switch redundancy. The active HACN 140 helps enable a distributed architecture by managing multiple HAs 144–164. The HACN 140, 142 intelligently selects of which HA 144–164 to use for a given call, addresses HA fault detection and HA load balancing. In this manner, the HACN 140, 142 manages HA 144–164 elements across the entire 3G network 108 and thereby relieves network administrators from the burden of changing configuration information each time a network change is made (e.g., adding or removing elements).

Registering a Mobile Node

A mobile node 78 registers with its HA 76 using a Mobile IP Registration Request message so that its HA 76 can create or modify a mobility binding record ("MBR") for that mobile node. The Registration Request message may be relayed to the HA 76 by the foreign agent 86 through which the mobile node 78 is registering, or it may be sent directly to the HA 76 in the case in which the mobile node 78 is registering a co-located care-of address. As is known in the art, "mobility binding" is the association of a home address with a care-of address, along with a timer for the association.

Table 1 illustrates an exemplary mobility binding record ("MBR") that is stored on the HA 76 for each mobile node 78. However, the present invention is not limited to the MBR fields illustrated in Table 1, and more, fewer or other fields can also be used in an MBR.

TABLE 1

| FIELD | SAMPLE VALUE | DESCRIPTION |
| --- | --- | --- |
| NAI | user1@domain.com | Network Access Identifier (NAI) identifies a Mobile user in a given domain. |
| MN IP Address | 11.0.0.4 | Mobile node's (MN) 78 IP Address |
| HA IP Address | 11.0.0.7 | IP Address of Home Agent (HA) 76 assigned to this user |
| FA IP Address (Care Of Address) | 12.0.0.4 | IP Address of FA 86 connected via IP tunnel 102 to HA 76 |
| Registration Request Sender IP Address | 11.0.0.4 | IP Address of last node which sent the Home Agent Control Node (HACN) 140 this Mobile IP Registration Request |
| MN LifeTime Timer | 10 seconds | The amount of time in seconds this binding is considered valid |
| MN Source Port | 16-bit value | Holds the source port of the MN 78 to which HACN 140 will send the registration reply. |
| Timestamp | 12345 | The globally synchronized time or locally synchronized time at which this MBR was last updated. |

A mobile node 78 initiates a registration whenever it detects a change in its network connectivity, or to update its registration lifetime timers. When it is away from home, the mobile node's Registration Request allows its HA 76 to create or modify a mobility binding record for it. When it is at home, the mobile node's 78 (de)Registration Request allows its HA 76 to delete any previous mobility binding(s) for it.

HAs 76 typically play a reactive role in the registration process. The home agent 76 receives Registration Requests from the mobile node 78 (perhaps relayed by a foreign agent 86), updates its record of the mobility bindings for this mobile node, and issues a suitable Registration Reply in response.

When the HA 76 accepts a valid Registration Request from a mobile node 78 that it serves as a HA 76, the HA 76 creates or modifies an entry in a MBR table for this mobile node 78 in its mobility binding tables including: the mobile node's care-of address; the Identification field from the Registration Reply; and the remaining Lifetime of the registration. The HA 76 also maintains mobility security associations (e.g., a shared secret, etc.) with various foreign agents 86.

When receiving a Registration Request from a foreign agent 86, if the HA 76 shares a mobility security association with the foreign agent 86, the HA 76 checks an Authenticator in the required Foreign-Home Authentication Extension in the request, based on the mobility security association. Similarly, when sending a Registration Reply to a foreign agent 86, if the HA 76 shares a mobility security association with the foreign agent 86, the HA 76 includes a Foreign-Home Authentication Extension in the message, based on this mobility security association.

The HA 76 examines the IP 48 Destination Address of arriving datagrams to see if it is equal to the home address of any of its mobile nodes 78 registered away from home. If so, the HA 76 tunnels 102 the datagram to the mobile node's 78 currently registered care-of address or addresses. If the HA 76 supports the optional capability of multiple simultaneous mobility bindings for one mobile node 78, it tunnels a copy to each care-of address in the mobile node's mobility binding tables. If the mobile node 78 has no current mobility bindings, the HA 76 does not attempt to intercept datagrams destined for the mobile node, and thus will not in general receive such datagrams. However, if the HA 76 is also a router handling common IP 48 traffic, it is possible that it will receive such datagrams for forwarding onto the home network 80. In this case, the HA 76 assumes the mobile node 78 is at home and simply forwards the datagram directly onto the home network 80.

If the Lifetime timer for a given mobility binding expires before the HA 76 has received another valid Registration Request for that mobile node 78, then that MBR is deleted from the mobility binding tables. The HA 76 typically does not send any Registration Reply message simply because the mobile node's 78 binding has expired. The entry in the visitor list of the mobile node's 78 current foreign agent 86 will typically expire naturally, probably at the same time as the binding expired at the HA 76. When a mobility binding's lifetime expires, the HA 76 deletes the MBR, but it retains other (non-expired) simultaneous mobility bindings that it holds for the mobile node 78.

HA/HACN Active/Failure Procedures

All active HAs 144–164 and standby HA 166 send periodic heartbeat messages to an active HACN 140. These messages include the current call load (e.g., data sessions including VoIP, H.323, etc.) and status of the sending HAs. The active HACN 140 responds with a heartbeat acknowledgement message. The active and standby HACNs 140, 142, send heartbeat messages to one another. The recipient of a heartbeat message will send a heartbeat acknowledgement message in response.

PDSNs 112 may be configured with the IP 48 address of an active HACN 140. Alternatively an active HACN's 140 IP 48 address may be configured in the mobile mode 78 (and provided in the Mobile IP Registration Request) or returned from a DNS server 120, AAA server 124, DHCP server, etc. The PDSN 112 will forward a mobile node's 78 Mobile IP Registration Requests to an active HACN 140, when HACN's are being used. When a HACN 140 receives a new Registration Request, it will forward the message to an HA (e.g., 144), with the HA 144 chosen such that load is balanced across all HAs 144–166.

Once an HA 144 receives a Mobile IP Registration Request that has been forwarded by the active HACN 140, it "takes over" the Mobile IP control and data session. The chosen HA 144 will return a Mobile IP Registration Reply directly to the entity that sent the Registration Request (either the PDSN 112 or the active HACN 140).

When a new session starts at an HA 144, the HA 144 sends an MBR update to the active HACN 140, so that it has a copy of the session information. When a session is terminated at an HA 144, the HA 144 sends an MBR update to the active HACN 140, so that it knows that it can delete its MBR from the HACNs 140 database.

If an HA 144 fails, the active HACN 140 will detect the failure because the failed HA 144 will not respond to a pre-determined number of heartbeat messages. The HACN 140 then assumes that the HA 144 has failed. It notifies a standby HA 166 that it must take over the failed HA's 144 role. The HACN 140 sends the standby HA 166 the failed HA's 144 IP address and typically downloads all of the failed HA's 144 MBRs to the standby HA 166. However, such a download suffers from the problems discussed above, problems overcome by the present invention. Once the standby HA 166 has these MBRs, it can bind to the IP address and take over for the failed HA 144.

If an active HACN 140 fails, the standby HACN 142 will detect the failure because the active HACN 140 will not respond to a number of heartbeats. The standby HACN 142 then assumes that the active HACN 140 is down. It then assumes the active HACN role by binding to the active HACN's IP address, and requesting all HAs 144–164 to download the now active HACN 142 their MBR data. However, such a download also suffers from the problems discussed above, problems overcome by the present invention.

The time required to complete an MBR upload or download for just one HA currently servicing its maximum number of calls (e.g., 10,000), can be in the range of multiple minutes or more. If a HACN fails, downloading MBRs from all active and standby HACN's can take very large amounts of time (e.g., hours). Thus, a large number of mobile node calls are typically dropped upon failure of a HACN or HA due to timeouts. The present invention is used to overcome some of the problems associated with HA or HACN failure procedures.

Reducing Communications Failures in Mobile Nodes

FIG. 7 is a flow diagram illustrating a Method 170 for reducing communication failures for mobile network devices. At Step 172, a multicast network address is provided on a home computer network for plural non-mobile network devices. The plural non-mobile network devices are used to control plural mobile network devices. The plural non-mobile network devices include a plural active non-mobile network devices and plural standby non-mobile network devices that transparently replace active non-mobile network devices in the event of a failure of an active non-mobile network device. At Step 174, an update message is received in a mobile protocol on an active non-mobile network device on the home network from a mobile network device whenever the network device roams to a foreign network and changes a network connectivity status. At Step 176, mobile communications information associated with the update message is sent from the active non-mobile network device to the multicast network address. The multicast network address multicasts the mobile communications information to other selected active non-mobile network devices and the plural standby non-mobile network devices. This provides the other selected active plural non-mobile network devices and plural standby non-mobile network devices with identical mobile communications information from the mobile network device that can be transparently used by a standby non-mobile network device to replace an active non-mobile network device in the event of a failure of an active non-mobile network device without downloading such information.

Method 170 is illustrated with one exemplary embodiment. However, the present invention is not limited to this embodiment and other embodiment with other components can also be used to practice the invention illustrated with Method 170.

In such an exemplary embodiment at Step 172, a multicast IP 48 address is provided on a server on a home network 80 associated with an active HACN 140. A standby HACN 142 transparently replaces the active HACN 140 in the event of a failure. A standby HA 166 transparently replaces an active HA 144–164 in the event of a failure.

As is known in the art, a multicast network address is used to multicast data packets to plural recipients simultaneously. For large amounts of data, IP multicasting is typically more efficient than normal IP transmissions. Unlike traditional IP traffic that requires separate connections for each source-destination pair, IP multicasting allows many recipients to share the same destination address. Thus, just one set of data packets is typically transmitted to the multicast destination network address for all destinations addresses. For more information on IP multicasting see the "Internet Multicast Address Allocation Architecture" described in IETF RFC-2908, and "Administratively Scoped IP Multicast", described in IETF RFC-2365, the contents of both of which are incorporated by reference.

In one embodiment of the present invention, the multicast network address is a multicast IP version 6 ("IPv6") address obtained from the Internet Assigned Numbers Authority ("IANA"). More information about IANA can be obtained from the URL "www.iana.org."

IPv6 multicast addresses are defined in "IP Version 6 Addressing Architecture" ITEF RFC-2373, the contents of which are incorporated herein by reference. This RFC defines fixed scope and variable scope multicast addresses. IPv6 multicast addresses are typically distinguished from unicast addresses by the value of the high-order octet of the addresses: a value of 0xFF (binary 11111111) identifies an address as a multicast address; any other value identifies an address as a unicast address. Rules for assigning new IPv6 multicast addresses are also defined in IETF RFC-2373.

In another embodiment of the present invention, the multicast network address is an IP version 4 ("IPv4") multicast address obtained from IANA. For more information on IPv4 multicast addresses see IETF RFC-1466, the contents of which is incorporated by reference.

In another embodiment of the present invention, the multicast network address is an IPv4 or IPv6 address privately assigned and managed by a system administrator for the home network 80. However, other types of multicast network addresses can also be used (e.g., UDP, etc.) and the present invention is not limited to multicast IP 48 addresses.

At Step 174, Mobile IP update messages are received on an active HA (e.g., 144) on the home network 80 whenever mobile nodes 78 roam to a foreign network 88 and change their network connectivity status. The Mobile IP update messages include at least Mobile IP Registration Request and De-registration Request messages. However, other update messages can also be used and the present invention is not limited to these messages.

To register a mobile node 78, a Mobile IP Registration Request message is sent from a mobile node 78 directly to an HA 144 or via the active HACN (e.g., 140). To de-register a mobile node 78, a Mobile IP de-registration request is sent from a mobile node 78 to directly an HA 144 or via the active HACN 140.

At Step 176, an MBR associated with the Mobile IP messages for the mobile node 78 is sent from the HA 144 (or HACN 140) to the multicast IP 48 address. This sends the MBR to the active HACN 140, standby HACN 142 and the standby HAs 166. After executing Step 176, the active HACN 140 as well as the standby HAs (e.g., 166) and the standby HACN (e.g., 142) will have an identical copy of the MBR information for the mobile node 78. Thus, if an active HACN or HA fails, MBRs need not be downloaded and hot-standby switching can be used.

To register the mobile node 78, the HA 144 receives and validates a Mobile IP Registration Request from the mobile node 78. The HA 144 will send the Mobile IP Registration Reply to the mobile node 78. At Step 176, the HA 144 sends an MBR update message to the multicast IP 48 address.

Currently, there are at least three ways in which de-registration of the mobile node 78 can occur. The PDSN 112 can send a Mobile IP Registration Reply with a Lifetime of zero (i.e., marked as deleted) directly to the HA 144, the HA 144 life time timer can expire for the mobile node 78, or the mobile node 78 can be manually de-registered (e.g., by a system administrator or application program 62 or via SNMP, etc.). Once the HA 144 determines that the session has been de-registered, it will send MBR delete message indicating the de-registered session to the multicast IP 48 address. After executing Step 176, the active HACN 140, the standby 142, and the standby HA 166 have identical copies of the MBR information for the mobile node 78.

A service provider typically deploys multiple chassis of HAs and HACNs. The service provider may require that a multicast HA/HACN group be limited to a particular chassis, or may span multiple chassis's. As a result, even though only one multicast IP address is typically ever used, separate logical channels for separate logical HA/HACN groups can be created.

In one embodiment of the present invention, logical channels are created using "shared secrets." However, the present invention is not limited to such an embodiment and other types of logical channels can be created using other procedures. As is known in the art, a "shared secret" is information used validate a message.

In such an embodiment, active HAs include a shared secret in MBR updates. If a HACN or HA receives an MBR update with a shared secret that it does not know, it discards the MBR update.

In one embodiment of the present invention, an easily configured and useable shared secret is the IP address of the active HACN 140. The active HACN 140 may distribute this shared secret or another arbitrary secret in heartbeat messages. However, the present invention is not limited to such an embodiment and other types of shared secrets or other security measures can also be used.

Method 170 helps reduce communication failures in mobile systems by allowing standby HACNs and HAs to have an updated set of MBRs obtained via the multicast address for hot-standby switches. The updated set of MBRs helps eliminate the need to upload and/or download of a large number of MBRs in most cases, when a HACN or HA fails. Method 170 allows a hot-standby switch can be made almost immediately after a determination that a HACN or HA has failed without uploading or downloading large numbers of MBRs, thus reducing communication failures and network congestion.

HA Crashes

When a HA fails (e.g., 144), crashes or is otherwise taken out of service, the active HACN 140 detects this event because the failed HA 144 no longer responds to heartbeat messages. An active HA 144 that has failed can be transparently switched with a hot standby HA 166 on the home network 80.

FIG. 8 is a flow diagram illustrating a Method 178 for switching between active and standby non-mobile network devices on a home network for mobile network devices. At Step 180, a standby non-mobile network device receives an identifier with a resolution protocol from an active non-mobile network device control node for an active non-mobile network device that has failed on a home network. At Step 182, the standby non-mobile network device determines which active communications the standby non-mobile network device will take over using the identifier and mobile communications information multicast to the standby non-mobile network device via a multicast network address on the home network. The mobile communications information includes mobile communication information for mobile network devices that have roamed away from the home network. At Step 184, mobile communications information on the standby non-mobile network device that is not relevant to the active communications the standby non-mobile network device will take over from the active non-mobile network device that has failed is deleted, thereby creating a set of optimized mobile communications information. At Step 186, the standby non-mobile network device is synchronized with the active non-mobile network device control node with a resolution protocol to update any optimized mobile communications information associated with the active communications the standby non-mobile communications device will take over that needs updating, if any. At Step 188, the status of the standby non-mobile network device is changed from standby to active to create a new active non-mobile network device, thereby transparently replacing the active non-mobile network device that has failed with the standby non-mobile network device on the home network.

Method 178 is illustrated with one exemplary embodiment. However, the present invention is not limited to this embodiment and other embodiment with other components can also be used to practice the invention illustrated with Method 178.

In such an exemplary embodiment, when the active HACN 140 detects a failed HA (e.g., 144), it will send a standby HA 166 an identifier of the HA 144 has failed. In one embodiment of the present invention, the identifier is the IP address of the failed HA 144. However, the present invention is not limited to such an embodiment and other identifiers can also be used alone or in combination with different identifiers (e.g., a NAI, a NAI and an IP address, etc. See Table 1). In such an embodiment, at Step 180, the standby HA 166 receives the IP 48 address of the failed HA 144 with the MBR-RP 63 from the active HACN 140.

At Step 182, the standby HA 166 determines which active communications the standby HA 166 will take over. This determination is made using the IP 48 address of the failed HA 144 and MBRs multicast to the standby HA 166 via the multicast IP 48 address on the home network 80 (e.g., via method 170) for the failed HA 144.

At Step 184, MBRs on the standby HA 166 that are not relevant to the active communications the standby HA 166 will take over from the failed HA 144 are deleted. This creates a set of optimized MBRs on the standby HA 166.

At Step 186, the standby HA 166 uses the MBR-RP 63 and synchronizes with the active HACN 140 to update the set of optimized MBRs associated with the active communications the standby HA 166 will take over, if any, that may need updating.

In virtually all instances, no updates will be necessary for the set of optimized MBRS, since the standby HA 166 has a complete set of MBRs for all active HAs 144–164. However, there is a possibility that an active HA 144 is in the process of sending one or more MBR updates, when active HA 144 fails. In such a scenario, the standby HA 166 may require synchronization of a small number of MBRs (e.g., <10) in the set of optimized MBRs, since a small number of MBRs may be lost.;

If updates any are necessary, the standby HA 166 uses the MBR-RP 63 to synchronize the optimized set of MBRs on the standby HA 166 with those on the active HACN 140. In most instances, only a very small number of MBRs (e.g., <10) will typically need updating since the standby HA 166 continuously receives MBR updates from the active HACN 140 via the multicast address via Method 170.

In one embodiment of the present invention, at Step 186, the standby HA 166 makes the update determination by calculating a hash value with a hashing function over the set of optimized MBRs stored on the standby HA 166 for the active HA 144 that failed. As is known in the art, a hashing function is a scheme for providing rapid access to data items that are distinguished by some key. Each data item to be stored is typically associated with a key. Virtually any non-secure (e.g., integer, multiplicative, bit-mix, etc.) or secure (e.g., MD4, MD5, etc.) hashing function known in the art can be used to calculate the hash value. For example, MD5 is a one-way hash secure hash function that takes data of any length and produces a 128 bit "fingerprint" or "message digest". This message digest is "non-reversible," and it is typically computationally infeasible to determine the data based on the message digest. For more information on MD5, see IETF RFC-1321, incorporated by reference.

The hash value is sent with the MBR-RP 63 from the standby HA 166 to the active HACN 140. The standby HA 166 receives an indication with the MBR-RP 63 from the active HACN as to whether the standby HA 166 should update any of the optimized MBRs associated with the active communications the standby HA 166 will take over.

At Step 188, the status of the standby HA 166 is changed from standby to active to create a new active HA, thereby transparently replacing the active HA 144 that has failed with the standby HA 166 on the home network 80. The active HACN 140 updates internal tables including the lists of active and standby HAs.

FIG. 9 is a flow diagram illustrating a Method 190 for switching between active and standby non-mobile network devices on a home network for mobile network devices. At Step 192, an active non-mobile network device control node determines that an active non-mobile network device on a home network has failed. At Step 194, an identifier is sent with a resolution protocol for the active non-mobile network device that has failed from the active non-mobile network device control node to a standby non-mobile network. At Step 196, the active non-mobile network device receives a first hash value with the resolution protocol from the standby non-mobile network device. The first hash value is calculated for a set of optimized mobile communications information stored on the standby non-mobile network device. The mobile communications information was multicast to the standby non-mobile network device via a multicast network address on the home network. The set of optimized mobile communications was created by deleting any mobile communications information on the standby non-mobile network device that is not relevant to active communications the standby non-mobile network device will take over from the active non-mobile network device that has failed. At Step 198, a second hash value is calculated for the same set of optimized mobile communications information stored on the active non-mobile network device control node. At Step 200, a determination is made as to whether the first hash value and the second hash value are equal. If the first and second hash values are not equal, an indication is sent with the resolution protocol to the standby non-mobile network device from the active non-mobile network device control node as to whether the standby non-mobile network device should update any of the optimized mobile communications information associated with the active communications the standby non-mobile communications device will take over.

Method 190 is illustrated with one exemplary embodiment. However, the present invention is not limited to this embodiment and other embodiment with other components can also be used to practice the invention illustrated in Method 190.

In such an exemplary embodiment at Step 192, the active HACN 140 determines that an active HA (e.g., 144) on a home network 80 has failed. At Step 194, an IP address is sent with MBR-RP 63 for the active HA 144 that has failed from the active HACN 140 to a standby HA (e.g., 166).

At Step 196, the active HACN 140 receives a first hash value with the MBR-RP 63 from the standby HA 166. The first hash value is calculated for a set of optimized MBRs created with Method 180 and stored on the standby HA 166. The MBRs were multicast to the standby HA 166 via a multicast network address on the home network 80 (e.g., with Method 170). The set of optimized MBRs were created by deleting MBRs on the standby HA 66 that is not relevant to active communications the standby HA 166 will take over from the active HA 144 that has failed.

At Step 198, a second hash value is calculated for the same set of optimized MBRs stored on the active HACN 140. The second has value is calculated using the same hashing function and the same optimized set of MBRs (e.g., identified by the IP 48 addresses of the failed HA 144) as were used on the standby HA 166. However, no MBRs are deleted on the active HACN 140 to create the optimized set of MBRs.

At Step 200, a determination is made on the active HACN 140 as to whether the first hash value and the second hash value are equal. If the first and second hash values are not equal, an indication is sent with the MBR-RP 63 to the standby HA 166 from the active HACN 144 to indicate that the standby HA 166 should update certain optimized MBRs associated with the active communications the standby HA 166 will take over.

If the first and second hash values are equal, the standby HA 166 does not need to update any optimized MBRs and the standby HA 166 can immediately switch from standby to active status.

HACN Crashes

When the active HACN 140 crashes the standby HACN 142 detects that the active HACN 140 has crashed because the active HACN 140 no longer response to heartbeat messages. The standby HACN 142 will then transparently replace the active HACN 140.

FIG. 10 is a flow diagram illustrating a Method 202 for switching between active and standby non-mobile network device control node on a home network for mobile network devices. At Step 204, a determination is made on a standby non-mobile network device control node that an active non-mobile network device control node on a home network has failed. The standby non-mobile network device control node includes stored mobile communications information for a plurality of mobile network devices that have roamed away from the home network. The mobile communications information was multicast to the standby non-mobile network device control node via a multicast network address on the home network. At Step 206, the standby non-mobile network device control node and any of plural active non-mobile network devices are synchronized with a resolution protocol to update, if necessary, any mobile communications information associated with the active communications the standby non-mobile network device control node will take over. At Step 208, the status of the standby non-mobile network device control node is changed from standby to active to create a new active non-mobile network device control node, thereby transparently replacing the active non-mobile network device control node that has failed with the standby non-mobile network device control node on the home network.

Method 202 is illustrated with one exemplary embodiment. However, the present invention is not limited to this embodiment and other embodiment with other components can also be used to practice the invention illustrated in Method 202.

In such an exemplary embodiment at Step 204, a determination is made on the standby HACN 142 that the active HACN 140 on a home network 80 has failed. The standby HACN 142 includes stored MBRs for plural mobile nodes 78 that have roamed away from the home network 80. The MBRs were multicast to the standby HACN 142 140 via a multicast network address on the home network 80 (e.g., with Method 170). Thus, in most instances, the HACN 142 has a complete, up-to-date set of MBRs from all active HAs 144–166.

At Step 206, the standby HACN 142 and any of plural active HAs 144–164 are synchronized with the MBR-RP 63 to update, if necessary, any MBRs associated with the active communications the standby HACN 142 will take over from the active HACN 140 that has failed.

In virtually all instances, no updates will be necessary. However, there is a possibility that an active HACN 140 or active HA 144–164 were in the process of sending one or more MBR updates to an active HA 144–164 when the active HACN 140 failed. In such scenarios, the standby HACN 142 may require synchronization of a small number of MBRs with one or more active HAs 144–166 (e.g., <10).

At Step 208, the status of the standby HACN 142 is changed from standby to active to create a new active HACN, thereby transparently replacing the active HACN 140 that has failed with the standby HACN 142 on the home network 80.

Later Insertion of a Standby HA

If a standby HA 166 is inserted later (i.e., after boot, after other HAs 144–164 are active, or after other HAs 144–164 or the active HACN 140 has sent messages to the multicast IP 48 address on the home network 80, etc.), it will not have a complete set of MBRs. As such, it will have to keep up with ongoing multicast MBR updates and deletions, as well as download previously multicast MBRs to catch-up and obtain a complete set of MBRs from active HAs 144–164, other active and standby HACNs.

Figure 11:
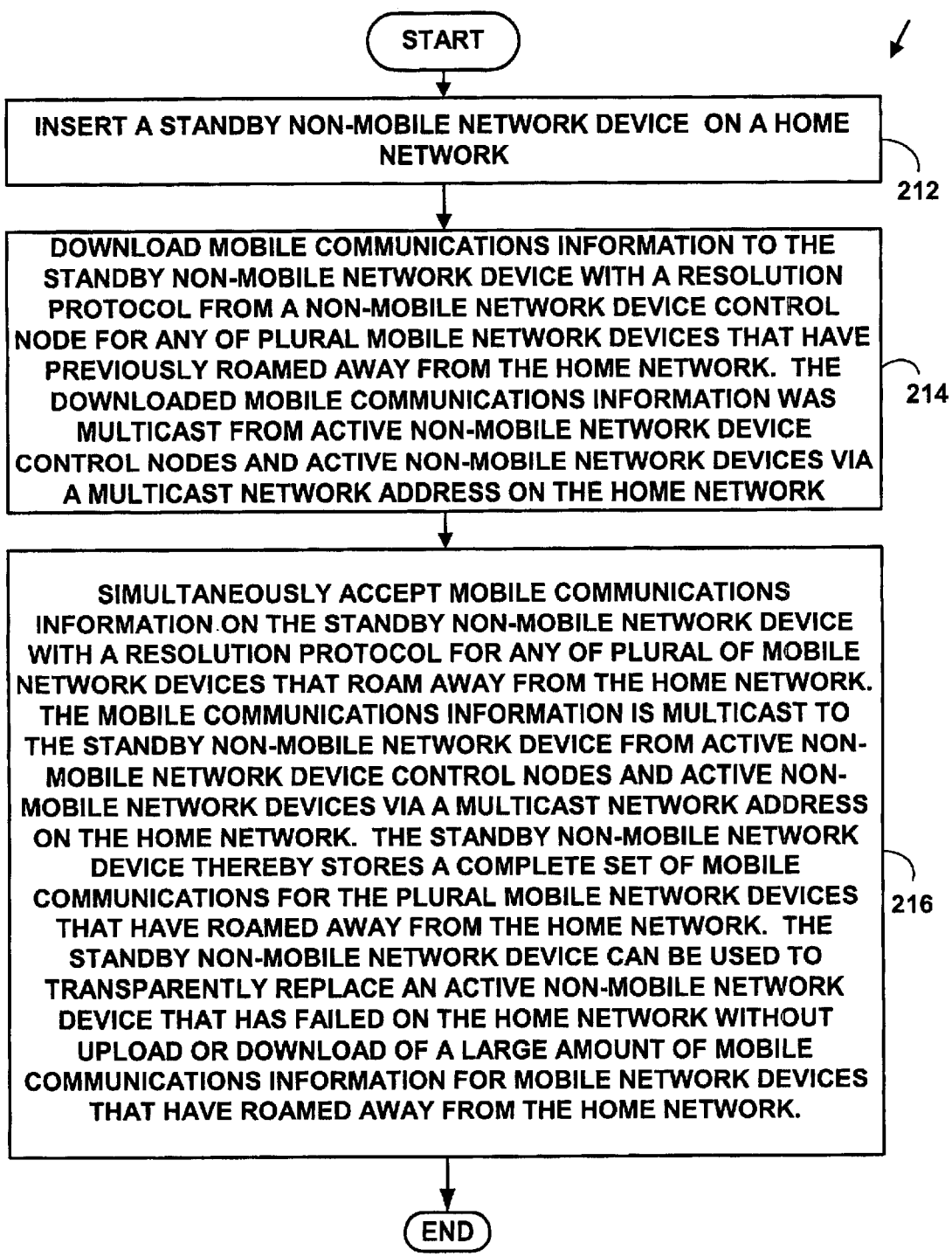
FIG. 11 is a method for later inserting a standby non-mobile network device on a home network for mobile network devices.

FIG. 11 is a Method 210 for later inserting a standby non-mobile network device on a home network for mobile network devices. At Step 212, a standby non-mobile network device is inserted on a home network. At Step 214, mobile communications information is downloaded to the standby non-mobile network device with a resolution protocol from a non-mobile network device control node for any of plural mobile network devices that have previously roamed away from the home network. The downloaded mobile communications information was multicast from active non-mobile network device control nodes and active non-mobile network devices via a multicast network address on the home network. At Step 216, mobile communications information is simultaneously accepted on the standby non-mobile network device with a resolution protocol or other type of protocol for any of plural of mobile network devices that roam away from the home network.

The mobile communications information is multicast to the standby non-mobile network device from active non-mobile network device control nodes and active non-mobile network devices via a multicast network address on the home network. The standby non-mobile network device thereby stores a complete set of mobile communications for the plural mobile network devices that have roamed away from the home network. The standby non-mobile network device can be used to transparently replace an active non-mobile network device that has failed on the home network without upload or download of a large amount of mobile communications information for mobile network devices that have roamed away from the home network.

In one embodiment of the present invention, Method 210 further comprises searching the set of mobile communications information on the standby non-mobile network device for any expired or marked deleted mobile communications information; and removing any expired or marked deleted mobile communications information from the complete set of mobile communications on the standby non-mobile network device, thereby storing an up-to-date complete set of mobile communications information on the standby non-mobile network device for the plurality mobile network devices that have roamed away from the home network.

Method 210 is illustrated with one exemplary embodiment. However, the present invention is not limited to this embodiment and other embodiment with other components can also be used to practice the invention illustrated in Method 210.

In such an exemplary embodiment at Step 212, a standby HA 166 is later inserted on the home network 80. At Step 214, MBRs are downloaded with the MBR-RP 63 to the standby HA 166 from the active HACN 140 for any of plural mobile nodes 78 that have previously roamed away from the home network 80. The downloaded MBRs were multicast from the active HACN 140 and active HAs 144–164 via the multicast IP address on the home network 80 (e.g., via Method 170).

At Step 216, MBRs are simultaneously accepted on the standby HA 166 with the MBR-RP 63 for any of plural of mobile nodes 78 that roam away from the home network 80 during the download at Step 214. To simultaneously accept the MBRs, the standby HA 166 may temporarily halt its download at Step 214 to accept new MBRs, or may asynchronously accept both the downloading MBRs as well as the new MBRs when they are multicast. The MBRs are multicast to the standby HA 166 from the active HACN 140 and active HAs 144–164 via a multicast IP 48 address on the home network 80 (e.g., via Method 170). The standby HA 166 thereby stores a complete set MBRs for the plural mobile nodes 78 that have roamed away from the home network 80. The standby HA 166 can be used to transparently replace an active HA 144–164 that has failed on the home network 80 without upload or download of a large amount of MBRs for mobile nodes 78 that have roamed away from the home network 80.

Table 2 illustrates exemplary actions completed by a standby HA 166 for Method 210. However, the present invention is not limited to these exemplary actions, and more, fewer or other actions can also be used.

TABLE 2

| Active HACN 140 | standby HA 166 | ACTION BY standby HA 166 |
|---|---|---|
| HACN 140 downloads a new MBR to standby HA 166 (Step 214) | standby HA 166 received the downloaded MBR for which no MBR entry exist | Create a new MBR on the standby HA 166. |
| HACN downloads an existing MBR to the standby HA 166 (Step 214) | standby HA 166 received the downloaded MBR, for which an entry already exists. | Check the time stamps and only replace the entry if the downloaded MBR has a more recent timestamp. |
| HACN downloads an update to an existing MBR to the standby HA 166 (Step 214) | standby HA 166 received the downloaded MBR (Step 214) followed by a multicast update of the same MBR (Step 216) | Update the MBR on the standby HA 166 with the parameters from the multicast update based on the timestamp in the MBR only if multicast later. |
| HACN downloads the MBR to the standby HA 166 just affer that HACN 140 received an multicast MBR update (Step 214) | standby HA 166 never receives a multicast update | When the standby standby HA 166 becomes active, check with HACN 140 for resynchronization. |
| HACN 140 has not downloaded a MBR received in a multicast update. | standby HA 166 receives an MBR multicast update (Step 216) | Standby HA 166 creates a new MBR and stores it. |

In one embodiment if the present invention, Method 210 further comprises searching the complete set MBRs on the standby HA 166 for any expired MBRs (i.e., Lifetime timers have expired) or "marked deleted" MBRs (i.e., Lifetime timer intentionally set equal to zero); and removing any expired or marked deleted MBRs from the complete set of MBRs on the standby HA 166, thereby storing an up-to-date complete set of MBRs on the standby HA 166 for the plural of mobile nodes 78 that have roamed away from the home network 80.

Later Insertion of a Standby HACN

If a standby HACN 142 is inserted later, it will not have a complete set of MBRs. As such, it will have to keep up with ongoing multicast MBR updates and deletions, as well as download previously multicast MBRs to catch-up and obtain a complete set of MBRs from the active HACN 140 and the active HAs 144–164.

FIG. 12 is a Method 218 for later inserting a standby non-mobile network device control node On a home network for mobile network devices. At Step 220, a standby non-mobile network device control node is inserted on the home network. At Step 222, mobile communications information is downloaded with a resolution protocol to the standby non-mobile network device control node from the active non-mobile network device control node for any of plural mobile network devices that have previously roamed away from the home network. The downloaded mobile communications information was multicast from active non-mobile network device control nodes and active non-mobile network devices via a multicast network address on the home network. At Step 224, mobile communications information is accepted simultaneously on the standby non-mobile network device control node with a resolution protocol for any of plural mobile network devices that roam away from the home network. The mobile communications information is multicast to the standby non-mobile network device control node from active non-mobile network device control nodes and active non-mobile network devices via the multicast network address on the home network. A complete set of mobile communications information is thereby stored on the standby non-mobile network device control node for the plural mobile network devices that have roamed away from the home network. The standby non-mobile network device control node can be used to transparently replace an active non-mobile network device control node that has failed on the home network without upload or download of a large amounts of mobile communications information for mobile network devices that have roamed away from the home network.

In one embodiment of the present invention, Method 218 further comprises searching the complete set of mobile communications information on the standby non-mobile network device control node for any expired or marked deleted mobile communications information; and removing any expired or marked deleted mobile communications information from the complete set of mobile communications on the standby non-mobile network device control node, thereby storing an up-to-date complete set of mobile communications information on the standby non-mobile network device control node for the plurality mobile network devices that have roamed away from the home network.

Method 218 is illustrated with one exemplary embodiment. However, the present invention is not limited to this embodiment and other embodiment with other components can also be used to practice the invention illustrated in Method 218.

In such an exemplary embodiment at Step 222, MBRs are downloaded with the MBR-RP 63 to the standby HACN 142 from the active HACN 140 for any of plural mobile nodes 78 that have previously roamed away from the home network 80. The downloaded MBRs were multicast from active HACN 140 and HAs 144–164 via a the multicast IP 48 address on the home network 80. At Step 224, MBRs are simultaneously accepted on the standby HACN 142 with the MBR-RP 63 for any of plural mobile nodes that roam away from the home network 80 during the download at Step 222. The MBRs are multicast to the standby HACN 142 from active HACN 140 and active HAs 144–164 via the multicast IP 48 address on the home network 80. A complete set of MBRs is thereby stored on the standby HACN 142 for the plural mobile node that have roamed away from the home network 80. The standby HACN 142 can be used to transparently replace the active HACN 140 that has failed on the home network 80 without upload or download of a large amounts of MBRs for mobile network devices that have roamed away from the home network 80.

In one embodiment if the present invention, Method 218 further comprises searching the complete set MBRs on the standby HACN 162 for any expired MBRs (i.e., Lifetime timers have expired) or marked deleted MBRs (i.e., Lifetime timer set equal to zero); and removing any expired or marked deleted MBRs from the complete set of MBRs on the standby HACN 142, thereby storing an up-to-date complete set of MBRs on the standby HACN 142 for the plural of mobile nodes 78 that have roamed away from the home network 80.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for reducing communications failures associated with mobile network devices, comprising:
   providing a multicast network address on a home network for a plurality of non-mobile network devices, wherein the plurality of non-mobile network devices are used to control a plurality of mobile network devices, and wherein the plurality of non-mobile network devices include a plurality of active non-mobile network devices and a plurality of standby non-mobile network devices that transparently replace active non-mobile network devices in the event of failures of active non-mobile network devices;
   receiving an update message in a mobile protocol on an active non-mobile network device control node on the home network from a mobile network device whenever the mobile network devices roams to a foreign network and changes a network connectivity status; and
   sending mobile communications information associated with update message from the active non-mobile network device control node to the multicast network address, which sends the mobile communications information to a plurality of other active non-mobile network devices and the plurality of standby non-mobile network devices,
   thereby providing the plurality of other active non-mobile network devices and the plurality of standby non-mobile network devices with identical mobile communications information from the mobile network device that can be transparently used by a standby non-mobile network device to replace an active non-mobile network device in the event of a failure of an active non-mobile network device without downloading all of the mobile communications information.

2. The method of claim 1 wherein the multicast address is a multicast Internet Protocol address.

3. The method of claim 1 wherein the mobile protocol is Mobile Internet Protocol.

4. The method of claim 1 wherein the plurality of non-mobile network devices include Mobile Internet Protocol home agent network devices and Mobile Internet Protocol home agent control node network devices.

5. The method of claim 1 wherein the plurality of non-mobile network devices includes a plurality of separate logical groups, wherein a logical group includes a plurality of distinct active non-mobile network devices and a plurality of distinct standby non-mobile network devices.

6. The method of claim 1 wherein the mobile communications information includes Mobile Internet Protocol mobility binding records.

7. A method for switching between active and standby non-mobile network devices on a home network for mobile network devices, comprising:
   receiving an identifier with a resolution protocol on a standby non-mobile network device from an active non-mobile network device control node for an active non-mobile network device that has failed on a home network;
   determining on the standby non-mobile network device which active communications the standby non-mobile network device will take over using the identifier and mobile communications information multicast to the standby non-mobile network device via a multicast network address on the home network, and
   wherein the mobile communications information includes mobile communication information for other mobile network devices that have roamed away from the home network;
   deleting any mobile communications information on the standby non-mobile network device that is not relevant to the active communications the standby non-mobile network device will take over from the active non-mobile network device that has failed, thereby creating a set of optimized mobile communications information;
   after receiving the identifier, synchronizing with the resolution protocol between the standby non-mobile network device and the active non-mobile network device control node any optimized mobile communications information associated with the active communications the standby non-mobile communications device will take over that needs updating, if necessary; and
   changing the status of the standby non-mobile network device from standby to active to create a new active non-mobile network device, thereby transparently replacing the active non-mobile network device that has failed with the standby non-mobile network device on the home network.

8. The method of claim 7 where in the multicast address is a multicast Internet Protocol address.

9. The method of claim 7 wherein the resolution protocol is a mobility binding records resolution protocol.

10. The method of claim 9 wherein the mobility binding records resolution protocol is an application layer protocol.

11. The method of claim 7 wherein the active non-mobile network device control node includes Mobile Internet Protocol home agent control node network devices and the active and standby non-mobile network devices include Mobile Internet Protocol home agent network devices.

12. The method of claim 7 wherein the mobile communications information includes Mobile Internet Protocol mobility binding records.

13. The method of claim 7 wherein the identifier is an Internet Protocol address.

14. The method of claim 7 wherein the active communications include Voice over Internet Protocol voice communications or Internet Protocol data communications.

15. The method of claim 7 wherein the synchronizing step includes:
    calculating a hash value over the set of optimized mobile communications information stored on the standby, non-mobile network device;
    sending the hash value with the resolution protocol from the standby non-mobile network device to the active non-mobile network device control node; and
    receiving an indication with the resolution protocol on the standby non-mobile network device from the active non-mobile network device control node as to whether the standby non-mobile network device should update any of the optimized mobile communications information associated with the active communications the standby non-mobile communications device will take over.

16. A method for switching between active and standby non-mobile network devices on a home network for mobile network devices, comprising:
    determining on an active non-mobile network device control node that an active non-mobile network device on a home network has failed;
    sending an identifier with a resolution protocol device for the active non-mobile network device that has failed from the active non-mobile network device control node to a standby non-mobile network device;
    receiving a first hash value with the resolution protocol on the active non-mobile network device control node from the standby non-mobile network device, wherein the first hash value is calculated for a set of optimized mobile communications information stored on the standby non-mobile network device,
    wherein mobile communications information was multicast to the standby non-mobile network device via a multicast network address on the home network, and
    wherein the set of optimized mobile communications was created by deleting any mobile communications information on the standby non-mobile network device that is not relevant to active communications the standby non-mobile network device will take over from the active non-mobile network device that has failed;
    calculating a second hash value for the same set of optimized mobile communications information stored on the active non-mobile network device control node;
    determining whether the first hash value and the second hash value are equal, and if not,
    sending an indication with the resolution protocol to the standby non-mobile network device from the active non-mobile network device control node to indicate the standby non-mobile network device should update certain optimized mobile communications information associated with the active communications the standby non-mobile communications device will take over.

17. The method of claim 16 wherein the multicast address is a multicast Internet Protocol address.

18. The method of claim 16 wherein the resolution protocol is a mobility binding records resolution protocol.

19. The method of claim 16 wherein the non-mobile network device control nodes Mobile Internet Protocol home agent control node network devices and the active and standby non-mobile network devices include Mobile Internet Protocol home agent network devices.

20. The method of claim 16 wherein the mobile communications information includes Mobile Internet Protocol mobility binding records.

21. A method for switching between active and standby non-mobile network device control nodes on a home network for mobile network devices, comprising:
    determining on a standby non-mobile network device control node that an active non-mobile network device control node on a home network has failed,
        wherein the standby non-mobile network device control node includes stored mobile communications information for a plurality of mobile network devices that have roamed away from the home network, and
        wherein the mobile communications information was multicast to the standby non-mobile network device control node via a multicast network address on the home network;
    synchronizing with a resolution protocol between the standby non-mobile network device control node and any of a plurality of active non-mobile network devices, any mobile communications information associated with the active communications the standby non-mobile network device control node will take over that need updating, if necessary; and
    changing the status of the standby non-mobile network device control node from standby to active to create a new active non-mobile network device control node, thereby transparently replacing the active non-mobile network device control node that has failed with the standby non-mobile network device control node on the home network.

22. The method of claim 21 wherein the multicast address is a multicast Internet Protocol address.

23. The method of claim 21 wherein the resolution protocol is a mobility binding records resolution protocol.

24. The method of claim 21 wherein the active and standby non-mobile network device control nodes include active and standby Mobile Internet Protocol home agent control node network devices and the standby non-mobile network devices include Mobile Internet Protocol home agent network devices.

25. The method of claim 21 wherein the mobile communications information includes Mobile Internet Protocol mobility binding records.

26. A method for later inserting an standby non-mobile network device on a home network for mobile network devices, comprising:
    inserting a standby non-mobile network device on the home network;
    downloading mobile communications information with a resolution protocol on the standby non-mobile network device for any of a plurality of mobile network devices that have previously roamed away from the home network,
        wherein the downloaded mobile communications information was unicast via a non-mobile network device control node on the home network; and accepting simultaneously mobile communications information on the standby non-mobile network device with a resolution protocol for any of a plurality of mobile network devices that roam away from the home network, wherein the mobile communications information is multicast to the standby non-mobile network device via the non-mobile network device control node address on the home network, thereby storing a complete set of mobile communications information on the standby non-mobile network device for the plurality of mobile network devices that have roamed away from the home network, wherein standby non-mobile network device can be used to transparently replace an active non-mobile network device that has failed on the home network without upload or download of a large amount of mobile communications information for mobile network devices that have roamed away from the home network.

27. The method of claim 26 further comprising:

searching the complete set of mobile communications information on the standby non-mobile network device for any expired or deleted mobile communications information; and removing any expired mobile communications information from the complete set of mobile communications on the standby non-mobile network device, thereby storing an up-to-date complete set of mobile communications information on the standby non-mobile network device for the plurality of mobile network devices that have roamed away from the home network.

28. The method of claim 26 wherein the resolution protocol is a mobility binding records resolution protocol.

29. The method of claim 26 wherein the non-mobile network device control node is a Mobile Internet Protocol home agent control node network devices and the standby non-mobile network devices include Mobile Internet Protocol home agent network devices.

30. The method of claim 26 wherein the mobile communications information includes Mobile Internet Protocol mobility binding records.

31. A method for later inserting an standby non-mobile network device control node on a home network for mobile network devices, comprising:

inserting a standby non-mobile network device control on the home network;

downloading mobile communications information with a resolution protocol on the standby non-mobile network device control node for any of a plurality of mobile network devices that have previously roamed away from the home network, wherein the downloaded mobile communications information was multicast via a multicast network address on the home network;

accepting simultaneously mobile communications information on the standby non-mobile network device control node with a resolution protocol for any of a plurality of mobile network devices that roam away from the home network, wherein the mobile communications information is multicast to the standby non-mobile network device via the multicast network address on the home network, thereby storing a complete set of mobile communications information on the standby non-mobile network device control node for the plurality of mobile network devices that have roamed away from the home network, wherein standby non-mobile network device control node can be used to transparently replace an active non-mobile network device control node that has failed on the home network without upload or download of a large amount of mobile communications information for mobile network devices that have roamed away from the home network.

32. The method of claim 31 further comprising:

searching the complete set of mobile communications information on the standby non-mobile network device for any expired or deleted mobile communications information; and removing any expired mobile communications information from the complete set of mobile communications on the standby non-mobile network device, thereby storing an up-to-date complete set of mobile communications information on the standby non-mobile network device for the plurality of mobile network devices that have roamed away from the home network.

33. The method of claim 31 wherein the multicast address is a multicast Internet Protocol address.

34. The method of claim 31 wherein the resolution protocol is a mobility binding records resolution protocol.

35. The method of claim 31 wherein the non-mobile network device control nodes include Mobile Internet Protocol home agent control node network devices and the standby non-mobile network devices include Mobile Internet Protocol home agent network devices.

36. The method of claim 35 wherein the mobile communications information includes Mobile Internet Protocol mobility binding records.

37. A method for reducing communications failures associated with mobile network devices, comprising:

providing a multicast Internet Protocol address on a home network for a plurality of non-mobile Mobile Internet Protocol network devices, wherein the plurality of non-mobile Mobile Internet Protocol network devices are used to control a plurality of mobile network devices and wherein the plurality of non-mobile Mobile Internet Protocol Network devices include a plurality of active home agents, a plurality of standby home agents, a plurality of active home agent control nodes, and a plurality of standby home agent control nodes, wherein a standby home agent transparently replaces an active home agent in the event of failures of an active home agent and a standby home agent control node transparently replaces active home agent control node in the event of failures of an active home agent control node;

receiving update messages in Mobile Internet Protocol on a active home agent on the home network from a plurality of mobile network devices whenever the plurality of mobile network devices roam to a foreign network and change a network connectivity status; and sending mobility binding records associated with the update messages with a resolution protocol from the active home agent to the multicast Internet Protocol address on the home network, wherein the multicast Internet Protocol address multicasts the plurality of mobility binding records to the plurality of standby home agents, the plurality of active home agent control nodes and the plurality of standby home agents control nodes, thereby providing the plurality of standby home agents and the plurality of active home agent control nodes and the plurality of standby home agent control nodes with identical mobile communications information for the mobile network device that can be used in the event of a failure of an active home agent or an active home agent control node, without downloading all of the Mobile Internet Protocol mobility binding records for the active home agent or active home agent control node that has failed.

38. A system for reducing communications failures associated with mobile network devices, comprising in combination:

a plurality of non-mobile network devices on a home network, wherein the plurality of non-mobile network devices are used to control a plurality of mobile network devices, and wherein the plurality of non-mobile network devices include a plurality of active non-mobile network devices and a plurality of standby non-mobile network devices that transparently replace active non-mobile network devices in the event of failures of active non-mobile network devices;

a multicast network address on the home network for a plurality of non-mobile network devices, wherein the plurality of non-mobile network devices are used to control the plurality of mobile network devices, thereby providing the plurality of active non-mobile network devices and the plurality of standby non-mobile network devices with identical mobile communications information that can be transparently used by a standby non-mobile network device to replace an active non-mobile network device in the event of a failure of an active non-mobile network device without downloading all of the mobile communications information; and a resolution protocol for receiving an identifier on a standby non-mobile network device from an active non-mobile network device control node for an active non-mobile network device that has failed on a home network, for downloading mobile communications information to and from a non-mobile network device, for sending and receiving an indication as to whether a standby non-mobile network device should update any mobile communications information associated with active communications the standby non-mobile communications device will take over from an active non-mobile network device that has failed, and for synchronizing any mobile communications information associated with active communications a standby non-mobile network device will take over from an active non-mobile network device that has failed, that need updating.

39. The system of claim 38 wherein the multicast address is a multicast Internet Protocol address.

40. The system of claim 38 wherein the plurality of non-mobile network devices include Mobile Internet Protocol home agent network devices and Mobile Internet Protocol home agent control node network devices.

41. The system claim 38 wherein the mobile communications information includes Mobile Internet Protocol mobility binding records.

42. A computer readable medium having stored therein instruction for causing a processor to execute functions comprising:

receiving an identifier with a resolution protocol on a standby non-mobile network device from an active non-mobile network device control node for an active non-mobile network device that has failed on a home network;

determining on the standby non-mobile network device which active communications the standby non-mobile network device will take over using the identifier and mobile communications information multicast to the standby non-mobile network device via a multicast network address on the home network, and wherein the mobile communications information includes mobile communication information for other mobile network devices that have roamed away from the home network;

deleting any mobile communications information on the standby non-mobile network device that is not relevant to the active communications the standby non-mobile network device will take over from the active non-mobile network device that has failed, thereby creating a set of optimized mobile communications information;

synchronizing with the resolution protocol between the standby non-mobile network device and the active non-mobile network device control node any optimized mobile communications information associated with the active communications the standby non-mobile communications device will take over that needs updating, if necessary; and changing the status of the standby non-mobile network device from standby to active to create a new active non-mobile network device, thereby transparently replacing the active non-mobile network device that has failed with the standby non-mobile network device on the home network.

43. A computer readable medium having stored therein instruction for causing a processor to execute functions comprising:

determining on an active non-mobile network device control node that an active non-mobile network device on a home network has failed;

sending an identifier with a resolution protocol device for the active non-mobile network device that has failed from the active non-mobile network device control node to a standby non-mobile network device;

receiving a first hash value with the resolution protocol on the active non-mobile network device control node from the standby non-mobile network device, wherein the first hash value is calculated for a set of optimized mobile communications information stored on the standby non-mobile network device, wherein mobile communications information was multicast to the standby non-mobile network device via a multicast network address on the home network, and wherein the set of optimized mobile communications was created by deleting any mobile communications information on the standby non-mobile network device that is not relevant to active communications the standby non-mobile network device will take over from the active non-mobile network device that has failed;

calculating a second hash value for the same set of optimized mobile communications information stored on the active non-mobile network device control node;

determining whether the first hash value and the second hash value are equal, and if not, sending an indication with the resolution protocol to the standby non-mobile network device from the active non-mobile network device control node to indicate the standby non-mobile network device should update certain optimized mobile communications information associated with the active communications the standby non-mobile communications device will take over.

44. A computer readable medium having stored therein instruction for causing a processor to execute functions comprising:
- determining on a standby non-mobile network device control node that an active non-mobile network device control node on a home network has failed,
  - wherein the standby non-mobile network device control node includes stored mobile communications information for a plurality of mobile network devices that have roamed away from the home network, and
  - wherein the mobile communications information was multicast to the standby non-mobile network device control node via a multicast network address on the home network;
- synchronizing with a resolution protocol between the standby non-mobile network device control node and any of a plurality of active non-mobile network devices, any mobile communications information associated with the active communications the standby non-mobile network device control node will take over that need updating, if necessary; and
- changing the status of the standby non-mobile network device control node from standby to active to create a new active non-mobile network device control node, thereby transparently replacing the active non-mobile network device control node that has failed with the standby non-mobile network device control node on the home network.

45. A computer readable medium having stored therein instruction for causing a processor to execute functions comprising:
- inserting a standby non-mobile network device on a home network;
- downloading mobile communications information with a resolution protocol on the standby non-mobile network device for any of a plurality of mobile network devices that have previously roamed away from the home network,
  - wherein the downloaded mobile communications information was unicast via a network address on the home network; and
- accepting simultaneously mobile communications information on the standby non-mobile network device with a resolution protocol for any of a plurality of mobile network devices that roam away from the home network,
  - wherein the mobile communications information is multicast to the standby non-mobile network device via the multicast network address on the home network,
- thereby storing a complete set of mobile communications information on the standby non-mobile network device for the plurality of mobile network devices that have roamed away from the home network,
  - wherein standby non-mobile network device can be used to transparently replace an active non-mobile network device that has failed on the home network without upload or download of a large amount of mobile communications information for mobile network devices that have roamed away from the home network,
  - whereby a standby non-mobile network device may be later inserted on a home network for mobile network devices.

46. A computer readable medium having stored therein instruction for causing a processor to execute functions comprising:
- inserting a standby non-mobile network device control on a home network;
- downloading mobile communications information with a resolution protocol on the standby non-mobile network device control node for any of a plurality of mobile network devices that have previously roamed away from the home network,
  - wherein the downloaded mobile communications information was multicast via a multicast network address on the home network;
- accepting simultaneously mobile communications information on the standby non-mobile network device control node with a resolution protocol for any of a plurality of mobile network devices that roam away from the home network,
  - wherein the mobile communications information is multicast to the standby non-mobile network device via the multicast network address on the home network,
- thereby storing a complete set of mobile communications information on the standby non-mobile network device control node for the plurality of mobile network devices that have roamed away from the home network,
  - wherein standby non-mobile network device control node can be used to transparently replace an active non-mobile network device control node that has failed on the home network without upload or download of a large amount of mobile communications information for mobile network devices that have roamed away from the home network.

47. A computer readable medium having stored therein instruction for causing a processor to execute functions comprising:
- providing a multicast Internet Protocol address on a home network for a plurality of non-mobile Mobile Internet Protocol network devices, wherein the plurality of non-mobile Mobile Internet Protocol network devices are used to control a plurality of mobile network devices and wherein the plurality of non-mobile Mobile Internet Protocol Network devices include a plurality of active home agents, a plurality of standby home agents, a plurality of active home agent control nodes, and a plurality of standby home agent control nodes, wherein a standby home agent transparently replaces an active home agent in the event of failures of an active home agent and a standby home agent control node transparently replaces active home agent control node in the event of failures of an active home agent control node;
- receiving update messages in Mobile Internet Protocol on a active home agent on the home network from a plurality of mobile network devices whenever the plurality of mobile network devices roam to a foreign network and change a network connectivity status; and
- sending mobility binding records associated with the update messages with a resolution protocol from the active home agent to the multicast Internet Protocol address on the home network, wherein the multicast Internet Protocol address multicasts the plurality of mobility binding records to the plurality of standby home agents, the plurality of active home agent control nodes and the plurality of standby home agents control nodes, thereby providing the plurality of standby home agents and the plurality of active home agent control nodes and the plurality of standby home agent control nodes with identical mobile communications information for the mobile network device that can be used in the event of a failure of an active home agent or an active home agent control node, without downloading all of the Mobile Internet Protocol mobility binding records for the active home agent or active home agent control node that has failed.

* * * * *